US012735936B2

(12) United States Patent
Rucinski

(10) Patent No.: US 12,735,936 B2
(45) Date of Patent: Sep. 15, 2026

(54) METHOD AND APPARATUS FOR MOUNTING A DOOR FRAME IN A BUILDING

(71) Applicant: SCI-PRO.ORG, LLC, Saline, MI (US)

(72) Inventor: Kevin John Rucinski, Saline, MI (US)

(73) Assignee: SCI-PRO.ORG, LLC, Saline, MI (US)

( * ) Notice: Subject to any disclaimer, the term of this patent is extended or adjusted under 35 U.S.C. 154(b) by 278 days.

(21) Appl. No.: 18/752,066

(22) Filed: Jun. 24, 2024

(65) Prior Publication Data

US 2024/0426167 A1 Dec. 26, 2024

Related U.S. Application Data

(60) Provisional application No. 63/522,935, filed on Jun. 23, 2023.

(51) Int. Cl.
*E06B 1/60* (2006.01)
*E06B 1/18* (2006.01)

(52) U.S. Cl.
CPC .............. *E06B 1/6023* (2013.01); *E06B 1/18* (2013.01)

(58) Field of Classification Search
CPC . E06B 1/6015; E06B 1/52; E06B 1/20; E06B 3/9682; E06B 1/045; E06B 1/62; E06B 2001/622; E06B 1/6069; E04F 21/0015
See application file for complete search history.

(56) References Cited

U.S. PATENT DOCUMENTS

| | | | | | |
|---|---|---|---|---|---|
| 2,541,871 | A | | 2/1951 | Heijmer et al. | |
| 3,016,993 | A | * | 1/1962 | Owen | E06B 3/5821 52/204.593 |
| 3,320,705 | A | | 5/1967 | Downing, Jr. | |
| 3,724,135 | A | | 4/1973 | Heliotes | |
| 3,788,019 | A | | 1/1974 | Kiselewski | |
| 3,793,788 | A | * | 2/1974 | Collins | E06B 1/20 52/214 |
| 3,861,099 | A | * | 1/1975 | Faudree | E06B 1/18 52/211 |
| 4,179,849 | A | * | 12/1979 | Kuffner | E06B 1/603 49/505 |
| 4,281,480 | A | | 8/1981 | Wendt | |
| 4,281,481 | A | * | 8/1981 | Wendt | E06B 5/161 49/504 |
| 4,308,692 | A | | 1/1982 | Rumble et al. | |
| 4,674,248 | A | | 6/1987 | Hall | |
| 4,878,325 | A | * | 11/1989 | Van Tuyl | E06B 1/20 49/505 |

(Continued)

*Primary Examiner* — Gisele D Ford
(74) *Attorney, Agent, or Firm* — Young Basile Hanlon & MacFarlane, P.C.

(57) ABSTRACT

The present invention provides an improved method and apparatus for mounting a door frame into a door opening of a building and includes at least one mounting bracket, a door support frame, and a trim frame. The at least one mounting bracket is connectable to the door opening and provides mounting pins for engaging the door support frame. The door support frame provides a bracket connecting portion and a soffit engaging portion that are integrally constructed and connected to a soffit of the door support frame. The trim frame is adjustably connected to the door support frame by engaging the bracket engaging portion and the soffit engaging portion of the door support frame.

12 Claims, 27 Drawing Sheets

(56) References Cited

U.S. PATENT DOCUMENTS 5,070,651 A * 12/1991 Jeter ........................ E06B 1/045
49/505
5,216,856 A 6/1993 Schroeder
5,220,748 A * 6/1993 Chadbourne ............. E06B 1/64
49/505
5,293,723 A * 3/1994 Slessor ..................... E06B 1/30
49/504
5,575,123 A 11/1996 Adams
5,596,851 A * 1/1997 Ting .......................... E06B 7/14
52/211
5,771,644 A 6/1998 Kidd
5,787,660 A 8/1998 Adams
5,845,439 A 12/1998 Hendley
6,192,638 B1 2/2001 Wang
6,286,274 B1 9/2001 McKann et al.
7,716,886 B2 5/2010 Gordon
8,782,974 B1 * 7/2014 Potts .......................... E06B 1/10
52/217
9,115,501 B2 8/2015 Rucinski et al.
2001/0023557 A1 9/2001 Graham
2003/0046886 A1 * 3/2003 Potts .......................... E06B 1/20
52/212
2009/0126278 A1 5/2009 Dixon
2011/0283624 A1 11/2011 Baer
2014/0260075 A1 * 9/2014 Rucinski ............. E04F 21/0015
52/745.15
2015/0113897 A1 * 4/2015 Behr ................... E04G 23/0277
52/514
2020/0270099 A1 * 8/2020 Yulkowski .............. B66B 13/24
2021/0071470 A1 * 3/2021 Daut ..................... E06B 7/2316
2021/0140223 A1 * 5/2021 Fox ........................... E06B 1/70
2022/0389748 A1 * 12/2022 Glover .................... E06B 1/045
2024/0026731 A1 * 1/2024 Daut .......................... E06B 1/18

* cited by examiner 56
187
189
201
203
205
207
209
210
Sash

METHOD AND APPARATUS FOR MOUNTING A DOOR FRAME IN A BUILDING

CROSS-REFERENCE TO RELATED APPLICATIONS

This Application claims the benefit of U.S. Provisional Application Ser. No. 63/522,935, filed on Jun. 23, 2023. The entire contents of these applications are incorporated herein by reference in their entirety.

FIELD OF THE INVENTION

The present invention relates to an improved method and apparatus for mounting a door frame in an opening of a building, and more particularly, an improved method and apparatus that provides for the rapid installation of a steel door frame into a doorway of a building that requires a minimal amount of labor and time for installation while reducing the amount of materials and parts, manufacturing steps, and assembly processes thereby reducing the costs and improving the efficiency of the improved method and process.

BACKGROUND

Welded steel door frame systems are widely used in the construction of commercial buildings. These welded steel door frames are known for their high-strength, long service life, and one-piece finished appearance. Non-welded steel frame door systems are known to be used in the commercial constructions industry as well, such as knocked down or multi-pieced designs, but such designs are not perceived as delivering the same value and benefits as a welded steel door frame system.

The installation of these welded steel door frame systems is labor intensive and driven by a complex logistics process. For instance, the design and construction of a typical one-piece steel door frame requires the door frame to be installed during the process of constructing the walls of the building which surround the door frame. As a result, the installation of the steel door frame must take place well in advance of the installation of the associated doors and door hardware. Because the steel door frames are installed early in the construction process, the steel door frames are susceptible to damage from construction activities taking place in and around the door openings.

In addition, the installation of a steel door frame typically requires multiple steps. That is, the steel door frames must first be assembled and installed, and then the associated doors are subsequently installed with their respective hardware. This typically requires several deliveries to the construction site due to the multiple component nature of the door frames and the associated door and hardware. Due to the weight of the door frame and the associated door, as well as the complexity of assembling the door frame and the associated door, the installation of the door frame and the door typically requires at least two laborers and multiple trips to and from the door opening to acquire and install the necessary components. Such installations are therefore inefficient and undesirable in the building industry.

As previously noted, there are typically numerous components involved in assembling the steel door frame, as well as the associated door and hardware. Thus, the site logistics for such components can be difficult, as the frames are often delivered to the job site in large quantities and must be stored on site where storage space is typically limited. Often such components are moved numerous times prior to the installation of the door frame and associated door and hardware, thereby subjecting the components to possible damage and loss. This, of course, creates further inefficiencies that are undesirable in the building industry.

Although previous designs are adaptable for various types of door frame applications, such designs are limited in their respective installation processes. For instance, welded frames must be installed during wall construction, and knock-down frames have functional and aesthetic issues. Thus, certain applications must be planned for in advance of installing previous designs. For instance, hospital door frames require that the soffit be raised off the floor and lowered from the header of the doorway to provide for thorough and simple cleaning of the floor and header of the door frame. Other door frame designs are not adaptable for concrete masonry unit (CMU) construction which utilizes cylinder blocks for wall construction. Sidelights or windows adjacent the door frame pose another problem for door frame constructions which are not readily addressed by previous designs. For these applications, previous designs must be developed in advance for the specific application thereby requiring specific parts and installation processes for each application and increasing the cost associated with multiple designs.

Previous designs have been created for mounting a steel door frame to a doorway that solve some or all the above noted problems. However, such designs include numerous parts and materials requiring multiple and complex manufacturing processes and assembly processes. Also, past designs are not intended to be easily disassembled once assembled, and therefore, additional labor is required to disassemble such designs should an error occur in the construction and assembly of the door frame. The high costs associated with such numerous parts and materials along with complex manufacturing and assembly processes leads to inefficiencies that are undesirable in the construction industry.

Considering these problems and inefficiencies with installing steel door frames and their associated doors and hardware, it would be desirable to provide an improved method and apparatus for mounting a steel door frame to a doorway in a building that reduces the costs associated with manufacturing, assembling, and installing the steel door frame by reducing the amount of materials and parts, reducing and simplifying the manufacturing processes, simplifying the assembly and installation processes, and designing multiple construction applications to increase the efficiency of installing such steel door frames.

SUMMARY OF THE INVENTION

The present disclosure provides an improved apparatus for mounting a door frame to a door opening defined by walls of a building, wherein said door opening is defined by a pair of substantially parallel side surfaces of said walls, and a floor substantially parallel to a top surface of said walls, wherein said floor and said top surface extend between said side surfaces of said walls. The apparatus includes at least one mounting bracket, wherein the at least one mounting bracket is connectable to at least one side surface of the walls. A plurality of mounting pins are connected to the at least one mounting bracket. A first door support frame has soffit formed therein, and a plurality of soffit engaging portions are connected to and enclosed within the soffit. A plurality of bracket engaging portions are integral with the plurality of soffit engaging portions for engaging the mounting pins on the at least one mounting bracket and connecting the door support frame to the at least one mounting bracket. A trim frame is connected to the plurality of bracket engaging portions and the plurality of soffit engaging portions for securing the trim frame to the door support frame. A lock clip releasably engages the mounting pins of the mounting bracket and secures the mounting bracket to the door support frame.

The door support frame has a first slot formed between the soffit engaging portion and the bracket engaging portion for receiving the trim frame. The bracketing engaging portion has a plurality of knobs extending therefrom into the first slot. The trim frame has a plurality of apertures wherein the trim frame is received by the first slot in the door support frame, and the plurality of knobs on the bracket engaging portion engage the plurality of apertures in the trim frame to releasably and adjustably secure the trim frame to the door support frame. The bracket engaging portion has a second slot extending therethrough adjacent the plurality of knobs, and the second slot is formed between the bracket engaging portion and the soffit engaging portion to allow the plurality of knobs to flex for releasable engagement of the plurality of knobs with the plurality of apertures formed in the trim frame.

The soffit of the door support frame forms a partial enclosure for receiving the soffit engaging portion which has tabs that engage notches formed in the soffit for locating the soffit engaging portion in the soffit. A landing, a flange, and a nub formed on the soffit engaging portion engage the soffit for further locating the soffit engaging portion in the soffit.

A jig has a plurality of apertures with grommets secured therein for releasably engaging the mounting pins of the mounting brackets to support and protect the mounting brackets prior to and during the assembly of the mounting brackets to the side surfaces of the walls. A metal strip is releasably attached to the mounting bracket to assist in the transportation and assembly of the mounting bracket to the side surfaces of the walls.

The door support frame has two sides and a header extending between the two sides, wherein the two sides of the door support frame each have ends with tabs that receive ends of the header. The ends of the two sides of the door support frame each having recesses and projections that engage similar recesses and projections formed in the ends of the header to form the door support frame.

At least one mounting adapter is connected to at least one inside surface of the walls and the at least one mounting bracket wherein the inside surface of the walls are fabricated from CMU.

A portion of the door support frame does not have a soffit formed therein wherein at least one bracket engaging portion not having a soffit engaging portion is connected to the door support frame to allow for no soffit to be formed on the door support frame adjacent the floor and the top surface of the door opening.

The first door frame is connected to a second door frame wherein the first door frame is aligned opposite the second door frame in a mirror configuration such that a mullion is formed adaptable to receive a sidelight. A glazing bead has an inverted U-shaped channel and a planar connecting portion wherein the U-shaped channel is adaptable to abut a side of the sidelight against the mullion, and the planar connecting portion is adaptable to extend under the sidelight. The planar connecting portion has an adjustable snap feature that engages at least one opening in the soffit of the first or second door frame to adaptably secure the sidelight in the mullion.

The present disclosure also provides a method of mounting a door frame to a door opening defined by walls of a building, wherein the door opening is defined by a pair of substantially parallel side surfaces of said walls and a floor substantially parallel to a top surface of the walls, wherein the floor and the top surface extend between the side surfaces of the walls. The method further incudes the steps of fastening at least one mounting bracket to at least one side surface of the walls, wherein the at least one mounting bracket is connected to the at least one side surface of the walls and provides a plurality of mounting pins connected thereto. The steps further include engaging a first door support frame with the plurality of mounting pins on the at least one mounting bracket wherein the door support frame has a bracket engaging portion and a soffit engaging portion that are integrally formed and attaching a trim frame to the bracket engaging portion and the soffit engaging portion of the door support frame. The steps also include releasably engaging the mounting pins of the mounting bracket with a lock clip to secure the mounting bracket to the door support frame. The method further includes sliding the trim frame into a slot formed between the sofit engaging portion and the bracket engaging portion wherein the bracket engaging portion has a plurality of knobs extending into the slot for receiving a plurality of apertures formed in the trim frame for releasably and adjustable connecting the trim frame to the door support frame.

The steps include attaching a jig to the mounting brackets wherein the jig has a plurality of apertures with grommets secured therein for releasably engaging the mounting pins on the mounting brackets for supporting and protecting the mounting brackets.

In addition, the method includes connecting at least one mounting adapter to the at least one inside surface of the walls and the at least one mounting bracket wherein the inside surface of the walls are fabricated from CMU.

The steps include providing a portion the first door support frame without a soffit formed therein and providing at least one bracket engaging portion without a soffit engaging portion and connected to the door support frame to allow for no soffit to be formed on the door support frame adjacent the floor and the top surface of the door opening.

The method further includes connecting the first door frame to a similar second door frame wherein the first door frame is aligned opposite the second door frame in a mirror configuration such that a mullion is formed and adaptable to receive a sidelight. A glazing bead is provided having an inverted U-shaped channel and a planar connecting portion wherein the U-shaped channel is adaptable to abut a side of the sidelight against the mullion and the planar connecting portion is adaptable to extend under the sidelight wherein a snap feature of the planar connecting portion engages at least one opening in the soffit of the first and second door frame to adaptably secure the sidelight in the mullion.

BRIEF DESCRIPTION OF THE DRAWINGS

The various features, advantages and other uses of the present apparatus will become more apparent by referring to the following detailed description and drawing in which.

DETAILED DESCRIPTION

Figure 1:
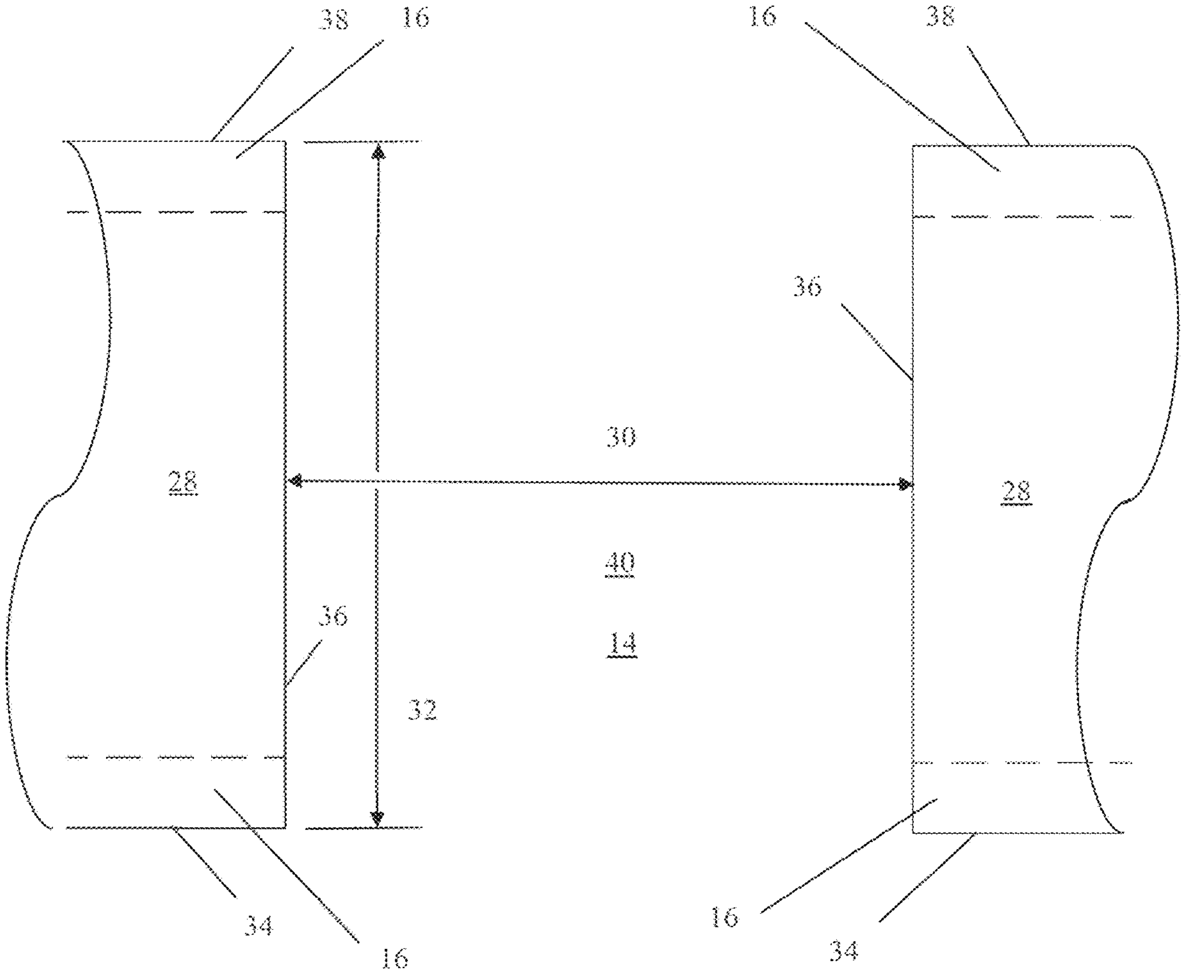
FIG. 1 is a sectional top plan view of a door opening in a building for receiving the improved apparatus and method for mounting a door frame in a building of the present invention.

The present invention provides an improved method and apparatus 10 for mounting a door frame 12 into a door opening 14 of a building (not shown). As seen in FIGS. 1-9, the improved method and apparatus 10 of the present invention is utilized to increase the efficiency of manufacturing, assembling, and mounting the door frame 12 into the door opening 14 of the building by reducing number of parts and material, reducing the amount and complexity of manufacturing, simplifying the assembly process, and designing for alternative constructions. The improved method and apparatus 10 of the present invention provides a pair of substantially similar mounting brackets 18 that are adjustably mounted to walls 28 of the building defining the door opening 14. Each of the brackets 18 has mounting pins 20 that extend inward toward the door opening 14. A three-sided door support or active frame 22 is received by the door opening 14 and may be mounted within the door opening 14 with or without a door (not shown) connected to the door support frame 22. The door support frame 22 is connected to the mounting brackets 18 by having slots 93 formed in the door support frame 22. The mounting pins 20 on the mounting brackets 18 are received by the slots 93 in the door support frame 22, thereby positioning and securing the door support frame 22 onto the mounting brackets 18 and into the door opening 14 of the building. A three-sided trim frame 26 is received from the opposite side of the door opening 14 and connected to the door support frame 22 to secure the trim frame 26 to the door support frame 22 and the mounting brackets 18. Once fully installed, the door is connected to the door frame 12 through the use of hinges (not shown) and associated hardware (not shown), if the door was not previously connected to the door support frame 22. If the door was previously connected to the door support frame 22, then only the associated door hardware need be assembled to the door.

The improved method and apparatus 10 of the present invention may be used to install the door frame 12 into the door opening 14 of the building, as seen in FIG. 1. The door opening 14 is defined by a pair of the opposing and substantially parallel, vertical walls 28, which may be constructed from wood or steel, wherein plasterboard 16 may cover the outer surfaces of the walls 28. The door opening 14 is further defined by a width 30 between the opposing walls 28 and a depth 32 defined by the width of the walls 28. The width 30 and the depth 32 typically have "rough" or approximate dimensioning, meaning that these dimensions do not have a fine tolerance specification. The door opening 14 is further defined by the walls 28 having a front surface 34, a side surface 36, and a rear surface 38. The door opening 14 also has a height (not shown) which is defined by the distance between a floor 40 of the building and a top surface (not shown) of the walls 28. The floor 40 and the top surface extend between the side surfaces 36 of the walls 28 defining the door opening 14. The height of the door opening 14 also has a "rough" or approximate dimensioning as described above. Although the walls 28 of the building have been described as fabricated from wood or steel with the plasterboard 16 applied to the front surface 34, rear surface 38, and top surface of the walls 28, it is anticipated that the walls 28 may be fabricated from any other conventional materials used in the construction industry.

Figure 2:
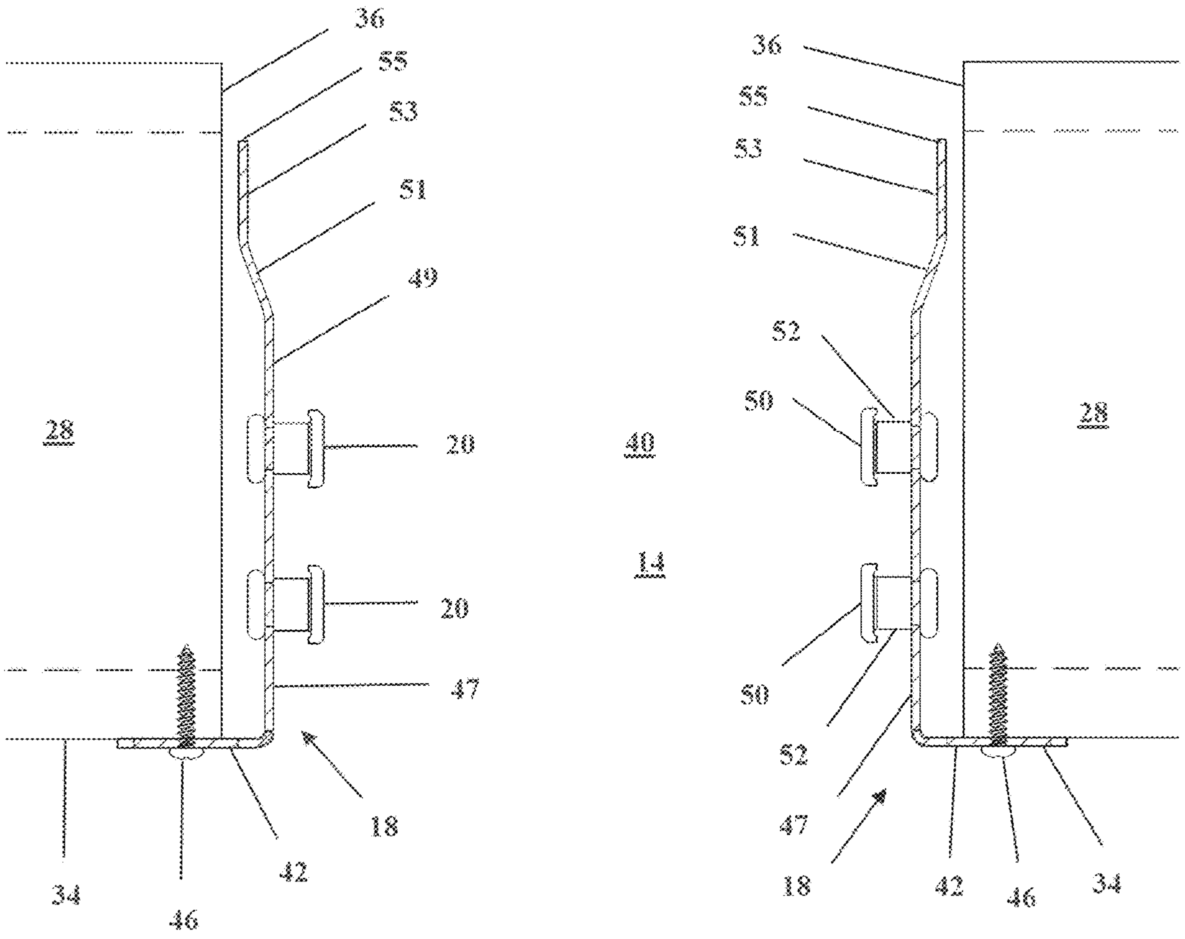
FIG. 2 is a sectional top plan view of the door opening of a building showing the mounting brackets of the improved apparatus and method for mounting a door frame in a building of the present invention.
Figure 9:
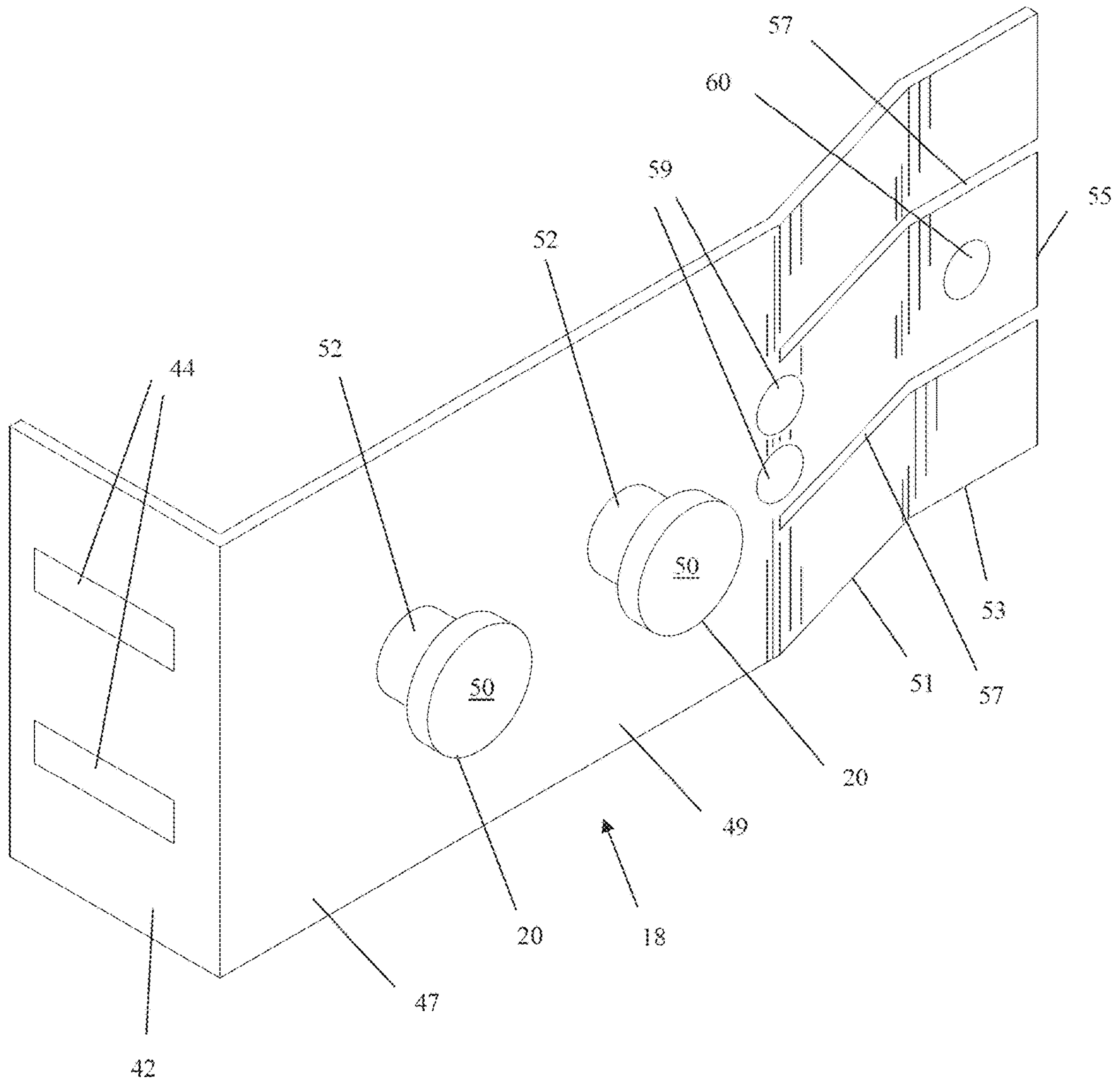
FIG. 9 is a perspective view of a portion of the mounting bracket showing the mounting pins for engaging the mounting slots and apertures in the door support frame of the improved apparatus and method for mounting a door frame in a building of the present invention.
Figure 11:
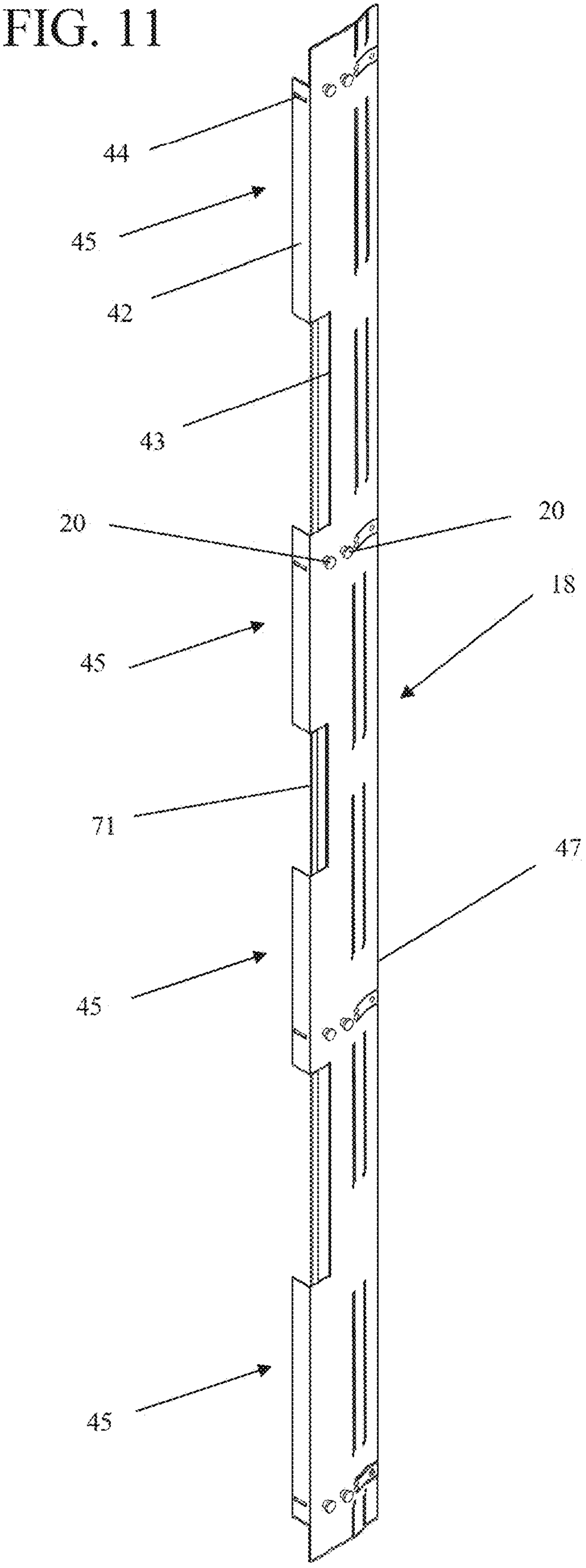
FIG. 11 is a perspective view of the mounting bracket of the improved apparatus and method for mounting a door frame in a building of the present invention.

To mount the improved method and apparatus 10 of the present invention into the door opening 14 of the building, the mounting brackets 18 are mounted to each of the vertical walls 28 within the door opening 14, as seen in FIGS. 2, 9, and 11. The two mounting brackets 18 are substantially similar, and each mounting bracket 18 extends along almost the entire vertical length of one of the opposing side surfaces 36 of the walls 28 from the floor 40 to the top surface defining the door opening 14. The mounting brackets 18 share the same configuration and can be used for either vertical wall 28 or side of the door opening 14, i.e., the mounting brackets 18 are not sided. Since both mounting brackets 18 are similar, one mounting bracket 18 will be described for brevity, although it should be realized that the description applies to both mounting brackets 18. The mounting bracket 18 has a continuous one-piece configuration and is fabricated from a high-strength, lightweight material, such as aluminum or steel. The mounting bracket 18 has an elongated, substantially L-shaped cross-sectional configuration wherein a short leg or flange 42 of the mounting bracket 18 extends adjacent to and along the front surface 34 of the wall 28, and a long leg 47 of the mounting bracket 18 extends adjacent to and along the side surface 36 of the wall 28. Three similar portions 43 of the flange 42 and the long leg 47 of the mounting bracket 18 may be cut away creating four separate, similar segments 45 of the mounting bracket 18. The three cut away portions 43 may provide access to hinges, strikers, and electrical power transfers (EPT). The disclosure is not limited to four separate segments 45 or three cut away portions 43, but rather, any number of separate segments and cut aways portions could be created. One or two slotted apertures 44 are provided in and through the flange 42 in each of the four segments 45 of the mounting bracket 18, and conventional fasteners 46 may extend through each of the slotted apertures 44 and into the front surface 34 of the wall 28 of the building to secure the brackets 18 to the wall 28. The slotted apertures 44 in the flange 42 of the mounting bracket 18 allow the mounting bracket 18 to slide horizontally relative to the fastener 46, thereby providing adjustment of the mounting bracket 18 along the width 30 of the door opening 14 to and from a centerline of the door opening 14 such that the distance between the two mounting brackets 18 can be adjusted accordingly. The disclosure is not limited to one or two slotted apertures 44 in each segment 45 of the mounting bracket 18, but rather, any number of slotted apertures 44 could be provided.

The long leg 47 of the L-shaped cross-sectional configuration of each of the mounting brackets 18 has a first substantially straight portion 49 that extends integrally from the flange 42 at a substantially right angle and substantially parallel to the side surface 36 of the wall 28. Three portions of the first straight portion 49 of the bracket 18 may be cut away that correspond with the three cut away portions of the flange 42 thereby creating the four separate segments 45 of the mounting bracket 18, as previously described. An angled portion 51 extends integrally between the first straight portion 49 of the mounting bracket 18 and a second substantially straight portion 53 of the mounting bracket 18, wherein the second straight portion 53 creates a free end 55 of the mounting bracket 18. The angled portion 51 angles toward the side surface 36 of the walls 28 and may be utilized to assist in the assembly of the door support frame 22 by guiding the door support frame 22 into a proper position within the door opening 14, as will be subsequently described. The angled portion 51 and the second straight portion 53 of the mounting bracket 18 have a pair of open ended, horizontal slots 57 extending therethrough from the free end 55 of the second straight portion 53 through to the angled portion 51 in each of the four segments of the mounting bracket 18 thereby creating a total of eight slots 57 in each mounting bracket 18. Two adjacent holes 59 extend through the angled portion 51 between the slots 57 in each of the four segments 45 of the mounting bracket 18, and a mounting hole 60 extends through the second straight portion 53 and between the slots 57 in each of the four segments of the mounting bracket 18 for a total of eight holes 59 and four mounting holes 60 in each mounting bracket 18. The holes 59 provide a hinge effect to the free end 55 of the mounting bracket 18 such that the free end 55 can bend or flex upon fasteners 46 extending through the mounting holes 60 and into the walls 28. A pair of the mounting pins 20 are connected to and extend from the first straight portion 49 of each of the four segments 45 of the mounting bracket 18 toward the door opening 14 for a total of eight mounting pins 20 on each mounting bracket 18. Each mounting pin 20 has a substantially circular head 50 integrally connected to an end of a smaller stem 52 which is connected to the mounting bracket 18. The mounting pins 20 of each mounting bracket 18 directly oppose one another at a specific and predetermined distance within the door opening 14.

Figure 10:
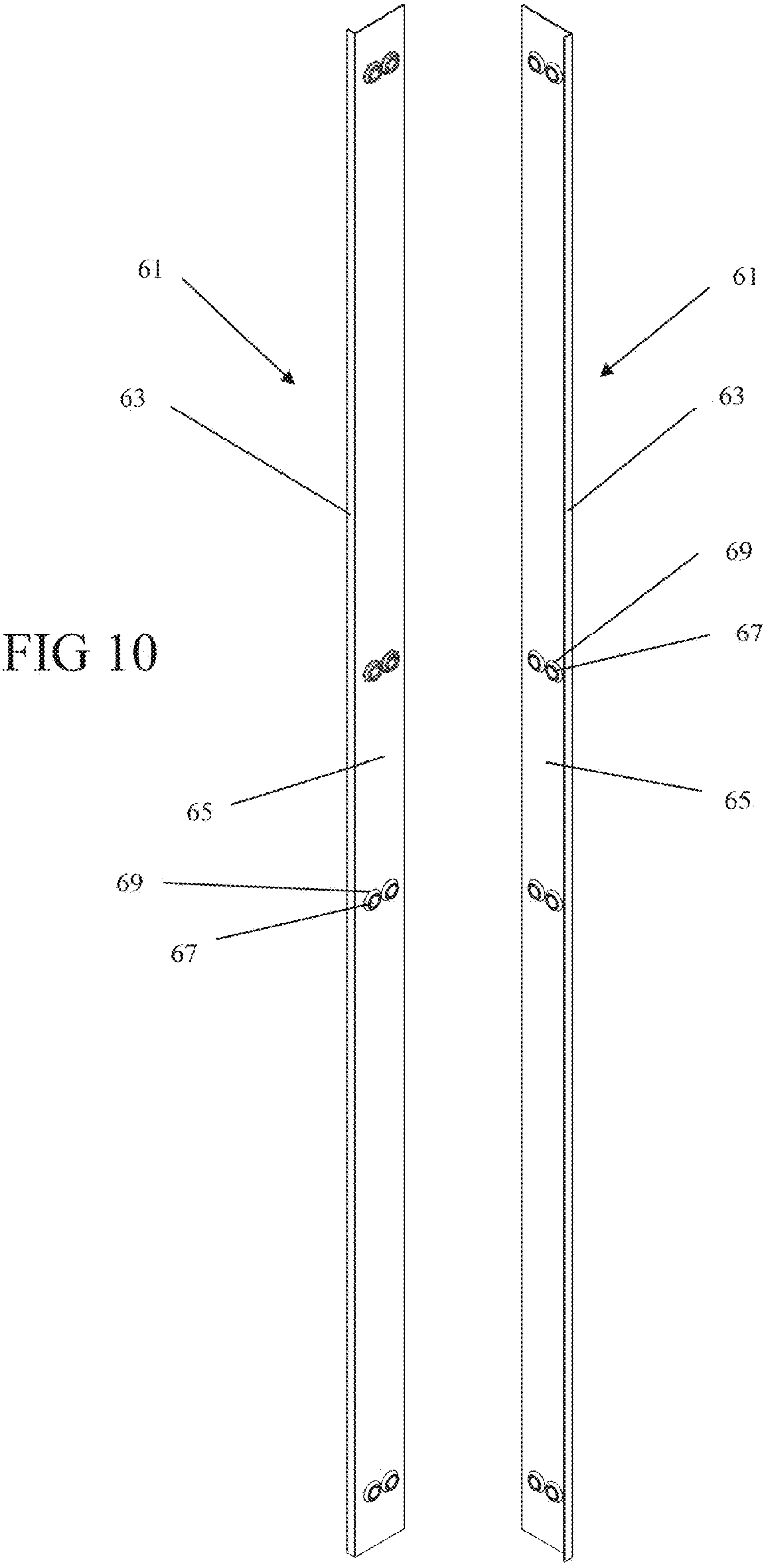
FIG. 10 are perspective views of the jig used to support and protect the mounting bracket of the improved apparatus and method for mounting a door frame in a building of the present invention.

To assist in mounting and transporting the mounting bracket 18, a jig 61 is provided for supporting and protecting the mounting bracket 18, as seen in FIG. 10. The jig 61 provides an integral, L-shaped structure that extends the length of the mounting bracket 18 and may be fabricated from any light weight, high-strength material such as aluminum, steel, or plastic. The L-shaped structure of the jig 61 provides a short leg 63 and a long leg 65, wherein the short leg 63 overlaps a portion of the flange 42 of the mounting bracket 18, and the long leg 65 overlaps the first straight portion 49 of the mounting bracket 18. Each long leg 65 of the jig 61 has apertures 67 that extend through the long leg 65 of the jig 61 and correspondingly align with the mounting pins 20 provided on the mounting brackets 18. Each aperture 67 in the jig 61 receives a rubber grommet 69 for receiving the mounting pins 20. When the jig 61 is aligned with the mounting bracket 18, the mounting pins 20 on the mounting bracket 18 are inserted into the grommets 69 provided on the jig 61 to tightly secure the jig 61 to the bracket 18. Due to the length of the mounting brackets 18, the mounting brackets 18 may bend or waiver when transporting and assembling the mounting brackets 18 to the walls 28, and thus, the jig 61 provides added support and stability to the mounting bracket 18 thereby allowing for easier assembly of the mounting bracket 18 to the walls 28. Furthermore, the jig 61 can be applied to the brackets 18 prior to shipping thereby providing protection to the mounting bracket 18 during shipping, transportation, and movement of the bracket 18 on the job site. In furtherance thereof, a metal strip 71 may be attached to the back of the mounting bracket 18 extending along the cut away portions 43 of the flange 42 and the first straight portion 49 of the bracket 18, as seen in FIG. 11. The metal strip 71 adds to the stiffness of the bracket 18 to assist in the transportation and assembly of the mounting brackets 18. The metal strip 71 may be removed from the mounting bracket 18 at any time to provide access to hinges, strikers, or EPTs for the doors.

Figure 3:
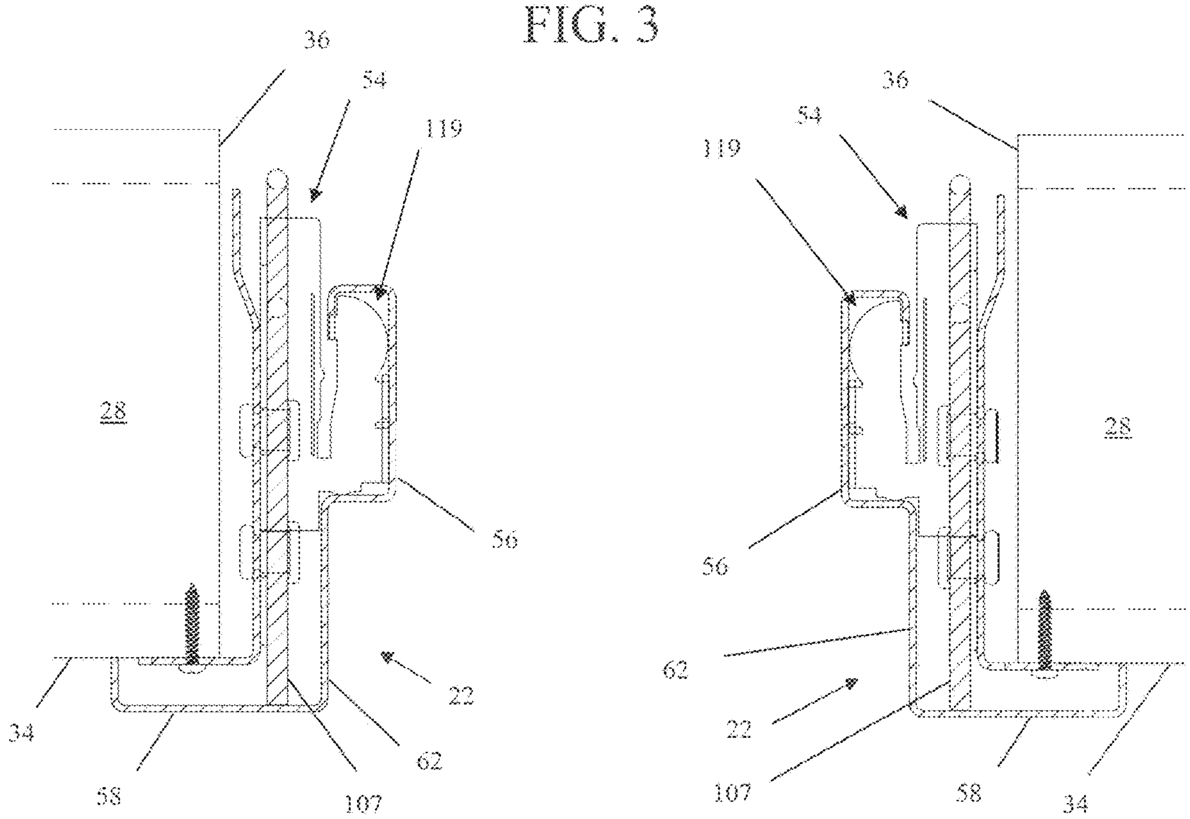
FIG. 3 is a sectional top plan view of the door opening of a building showing the mounting brackets connected to a door support frame of the improved apparatus and method for mounting a door frame in a building of the present invention.
Figure 12:
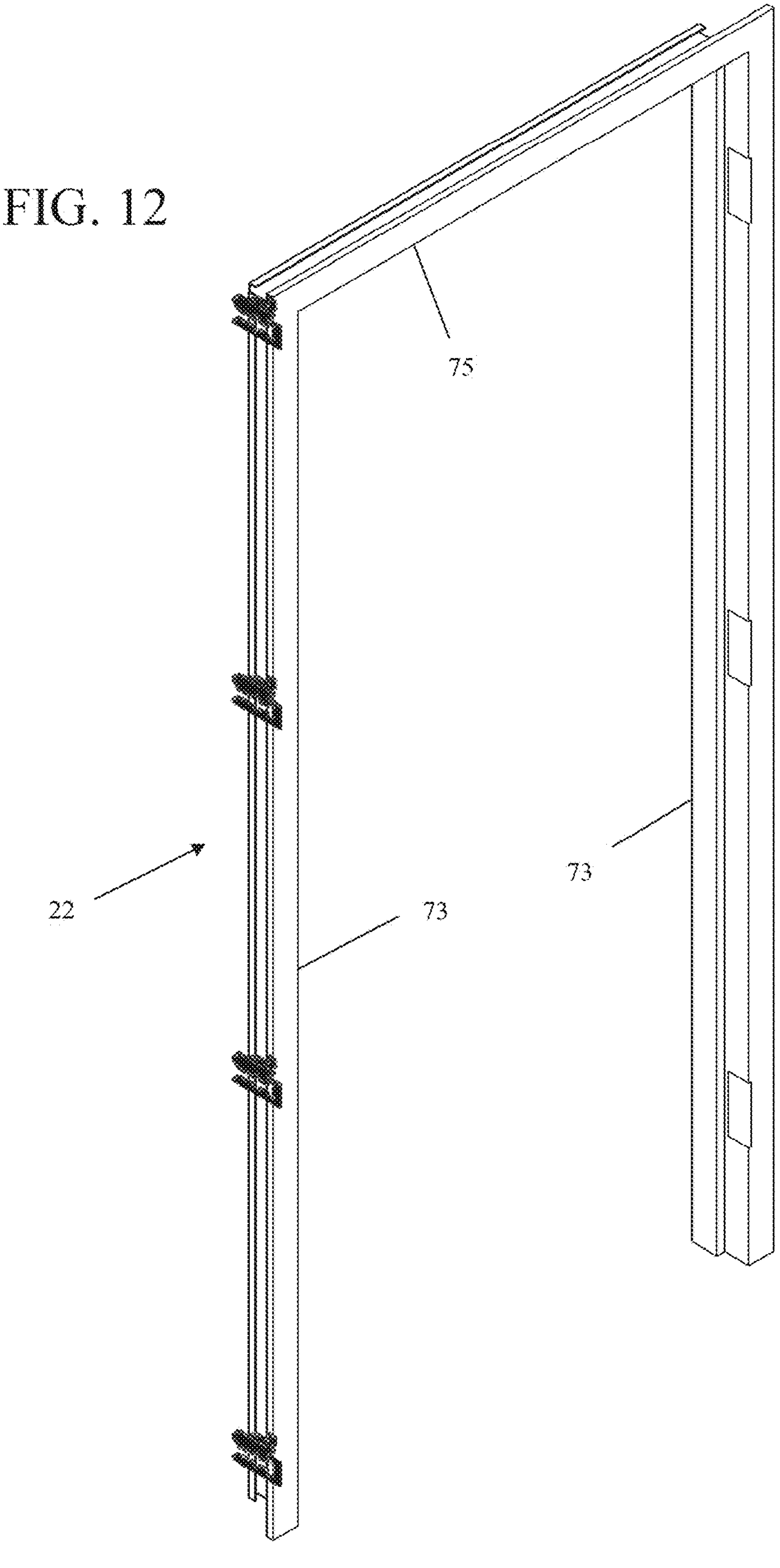
FIG. 12 is a perspective view of the door support frame of the improved apparatus and method for mounting a door frame in a building of the present invention.
Figure 14:
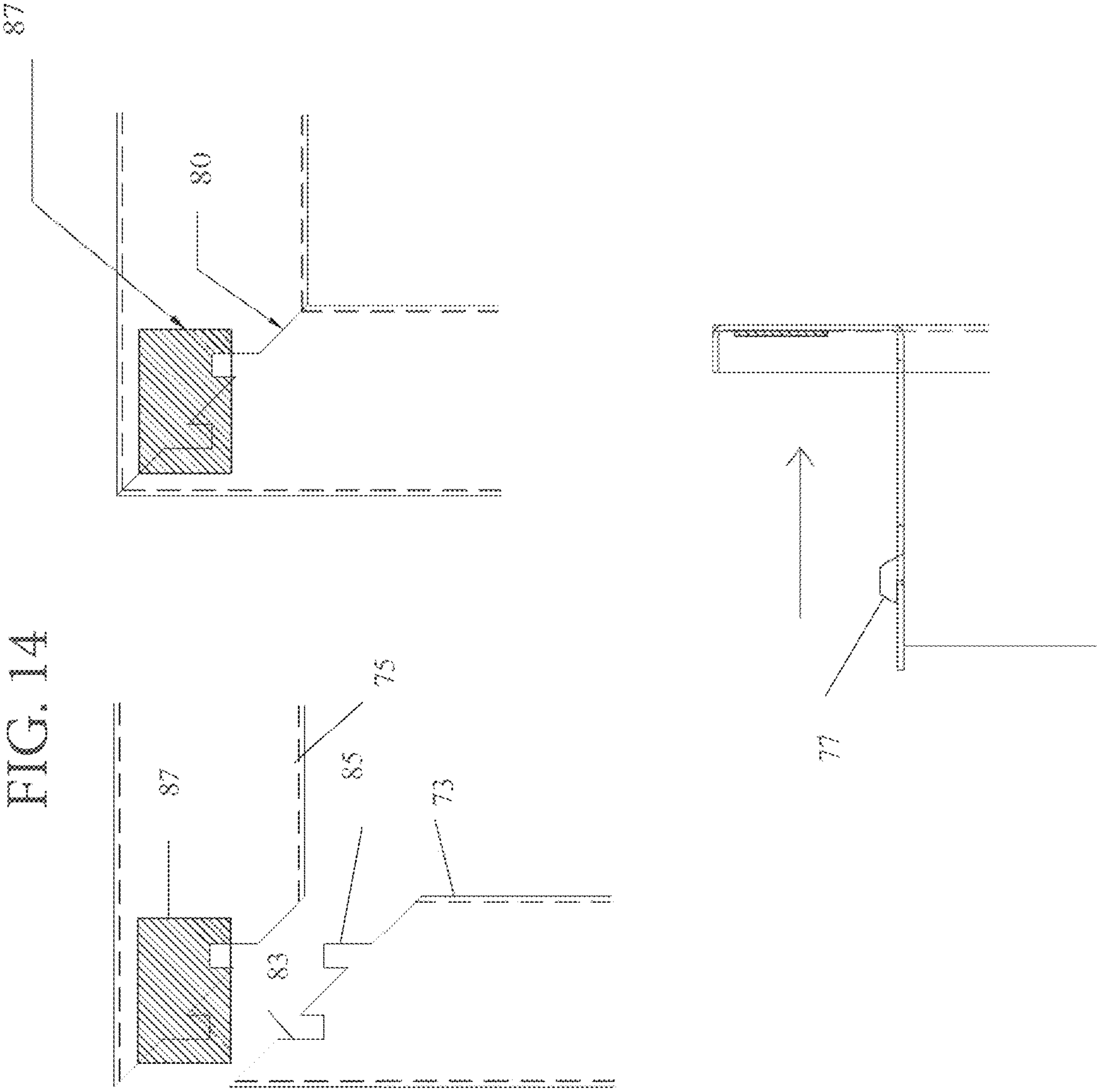
FIG. 14 is a schematic diagram showing the recesses and projections utilized to connect, align, and weld the headers with the door support frame and the trim frame of the improved apparatus and method for mounting a door frame in a building of the present invention.

To secure the door support frame 22 to the brackets 18, the door support frame 22 is inserted into the door opening 14 from the front surface 34 of the walls 28, as seen in FIGS. 3 and 12. The door support frame 22 may be fabricated from a high-strength, lightweight material, such as steel or aluminum, or from other conventional building materials, such as wood. As seen in FIG. 12, the door support frame 22 has a three-sided, substantially U-shaped configuration having similar opposing sides 73 and a header or top 75 extending between the sides 73. The sides 73 of the door support frame 22 are connected to the header 75 by use of tabs 77, as seen in FIG. 14, which extend from the top end of each side 73 of the door support frame 22 and engage ends of the header 75. The tabs 77 are an improvement over previous designs which bent the tab over thereby creating dimensional variations. The top angled corners of the sides 73 and the header 75 of the door support frame 22 have corresponding recesses 83 and projections 85 which matingly engage when assembled. A small plate 87 may be attached to the angled corner 81 of the sides 73 or the header 75 of the door support frame 22 to ensure the recesses 83 and projections 85 align properly. The seam 80 created between the recesses 83 and the projections 85 are then welded to fixedly connect the header 75 to the sides 73 of the door support frame 22. The welding operation could ideally be performed by robotic welders or other forms of programmable welding which is an improvement over manual welding which is the standard practice today for door frames. This same structure and construction may be utilized on the trim frame 26.

As seen in FIGS. 3 and 12, the door support frame 22 extends along the side surfaces 36, the top surface, and the front surface 34 of the walls 28 defining the door opening 14. Each one of the three sides 73, 75 of the door support frame 22 has a generally L-shaped cross-sectional configuration, wherein a shorter leg 58 of the L-shaped configuration of the door support frame 22 extends across and adjacent to the front surface 34 of the walls 28. A longer leg 62 of the L-shaped configuration of the door support frame 22 extends into the door opening 14 along the side surfaces 36 and top surface of the walls 28 and provides a jamb or soffit 56 integral with and extending from the longer leg 62 of the door support frame 22. The soffit 56 has a substantially rectangular, open-ended configuration and extends further into the door opening 14 along the width 30 of the door opening 14 than the longer leg 62 of the door support frame 22.

Four similar bracket connecting portions 54 and soffit engaging portions 119 are connected to each vertical side 73 of the door support frame 22 and are utilized to connect the door support frame 22 to the mounting bracket 18, as seen in FIG. 12. Each bracket connecting portion 54 and soffit engaging portion 119 are integrally and unitarily constructed as a single piece construction fabricated from a light weight, high strength material such as aluminum or steel, as seen in FIGS. 3 and 6A-6D. The four bracket connecting portions 54 and soffit engaging portions 119 correspond with the four segments 45 of the mounting bracket 18. The disclosure is not limited to four bracket connecting portions 54 and soffit engaging portions 119 on each vertical side of the door support frame 22, but rather, any number of bracket connecting portions 54 and soffit engaging portions 119 may be utilized on the door support frame 22. For purposes of simplicity and brevity, we will describe one of the bracket connecting portions 54 and soffit engaging portions 119 as each of the bracket connecting portions 54 and soffit engaging portions 119 have similar constructions and may be utilized on either side of the door support frame 22, in other words, the bracket connecting portions 54 and soffit engaging portions 119 are not handed. By producing a unitary, non-handed bracket connecting portion 54 and soffit engaging portion 119, the number of parts needed to be fabricated is reduced thereby reducing the costs associated with producing the method and apparatus 10 of the present invention.

Figure 3A:
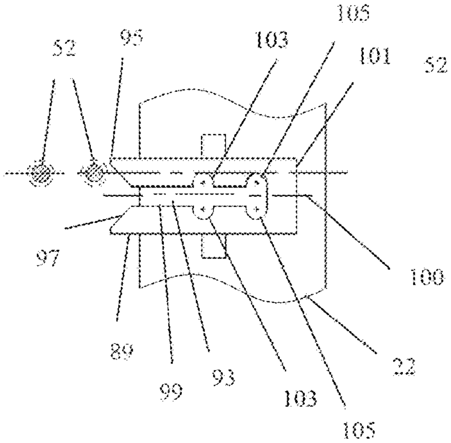
FIG. 3A-3C is a schematic diagram showing a slot in the door support frame engaging mounting pins on the mounting bracket of the improved apparatus and method for mounting a door frame in a building of the present invention.
Figure 3B:
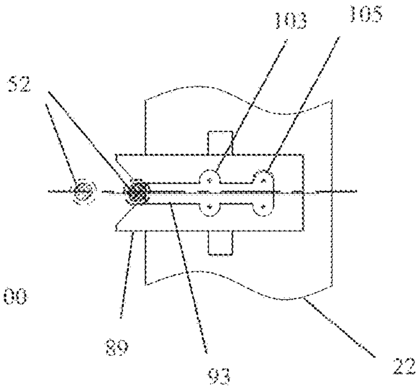
Figure 3C:
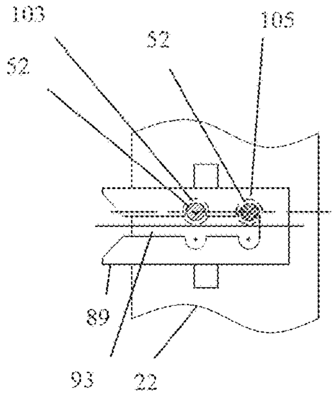

Each bracket connecting portion 54 has a substantially flat bottom 89 and a pair of substantially similar side walls 91 that extend integrally from and substantially perpendicular to the bottom 89. The bottom 89 of the bracket connecting portion 54 contains the open-ended, horizontal slot 93 that extends into and through the bottom 89, as seen in FIGS. 3A-3C. The slot 93 begins at a first end 95 of the bottom 89 with an angled entry way 97 leading to a substantially straight portion 99 extending along a longitudinal axis 100 of the bottom 89 of the bracket connecting portion 54. The slot 93 ends at a close end prior to reaching a second end 101 of the bottom 89. The slot 93 further provides a first pair of similar, opposing semi-circular recesses 103 in communication with the straight portion 99 of the slot 93 and extending along a first axis substantially perpendicular to the longitudinal axis 100 of the bottom 89. A second pair of similar, opposing semi-circular recesses 105 are provided at the closed end of the substantially straight portion 99 of the slot 93 and are also in communication with the straight portion 99 of the slot 93 extending along a second axis substantially perpendicular to the longitudinal axis 100 of the bottom 89 and substantially parallel to the first axis of the first pair of opposing semi-circular recesses 103.

When the bracket connecting portion 54 is connected to the door support frame 22, as will be disclosed later in the description, the slot 93 in the bottom 89 of the bracketing connecting portion 54 receives the stems 52 of the mounting pins 20 in the mounting bracket 18 by having the stem 52 of the mounting pin 20 enter the slot 93 at the open ended portion of the slot 93 while the head 50 of the mounting pin 20 extends beyond and outside the slot 93 in the bottom 89. As the door support frame 22 is moved horizontally into the door opening 14 from the front surface 34 of the wall 28, the slots 93 in the bottom 89 of the bracketing connecting portion 54 are aligned with the stems 52 of the mounting pins 20 in the mounting bracket 18 such that the stems 52 of the mounting pins 20 are guided into the slots 93 by the angled entry way 97 at the beginning of the slot 93, as seen in FIG. 3A. As the door support frame 22 is moved further horizontally into the door opening 14, the stems 52 of the mounting pins 20 move into the straight portion 99 of the slot 93 along the longitudinal axis 100 of the bottom 89, as seen in FIG. 3B. The head 50 of the mounting pin 20 is larger than the width of the slot 93 thereby capturing the bottom 89 between the mounting bracket 18 and the head 50 of the mounting pin 20 and maintaining the stem 52 of the mounting pins 20 in the slot 93 until the stems 52 reach the first and second recesses 103, 105 in the bottom 89 of the bracket connecting portion 54. Once the stems 52 of the mounting pins 20 reach the first and second recesses 103, 105 in the bottom 89 of the bracket connecting portion 54, the door support frame 22 is allowed to fall or lower thereby allowing the stems 52 of the mounting pins 20 to engage the upper first and second recesses 103, 105, as seen in FIG. 3C. The door support frame 22 hangs from the stems 52 of the mounting pins 20 of the brackets 18 without having the bottom of the door support frame 22 contacting the floor 40 of the building. This ensures that the door frame 12 will remain level and substantially perpendicular. The method and apparatus 10 also allows an installer to install the door support frame 22 with a door mounted thereon, and once the door support frame 22 is mounted to the mounting bracket 18, the door support frame 22 will not fall back out of the door opening 14. In addition, the method and apparatus 10 secures the door support frame 22 to the brackets 18 without the need for a second installer. The lower or opposing first and second recesses 103, 105 do not engage the stems 52 of the mounting pins 20 but are designed to allow the same bracket mounting portion 54 to be utilized on either side of the door support frame 22, thereby eliminating the need to produce different bracket mounting portions 54 for each side of the door support frame 22. In other words, the bracket mounting portions 54 are not handed. This reduces the cost associated with designing and manufacturing different and additional parts.

Figure 3D:
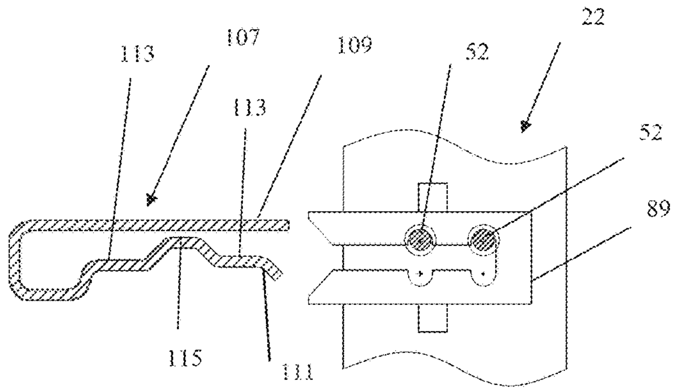
FIGS. 3D and 3E is a schematic diagram showing a stud lock clip engaging and locking the mounting pins of the mounting bracket in the recesses of the door support frame of the improved apparatus and method for mounting a door frame in a building of the present invention.
Figure 3E:
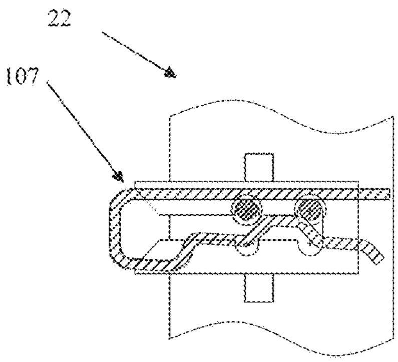
Figure 4:
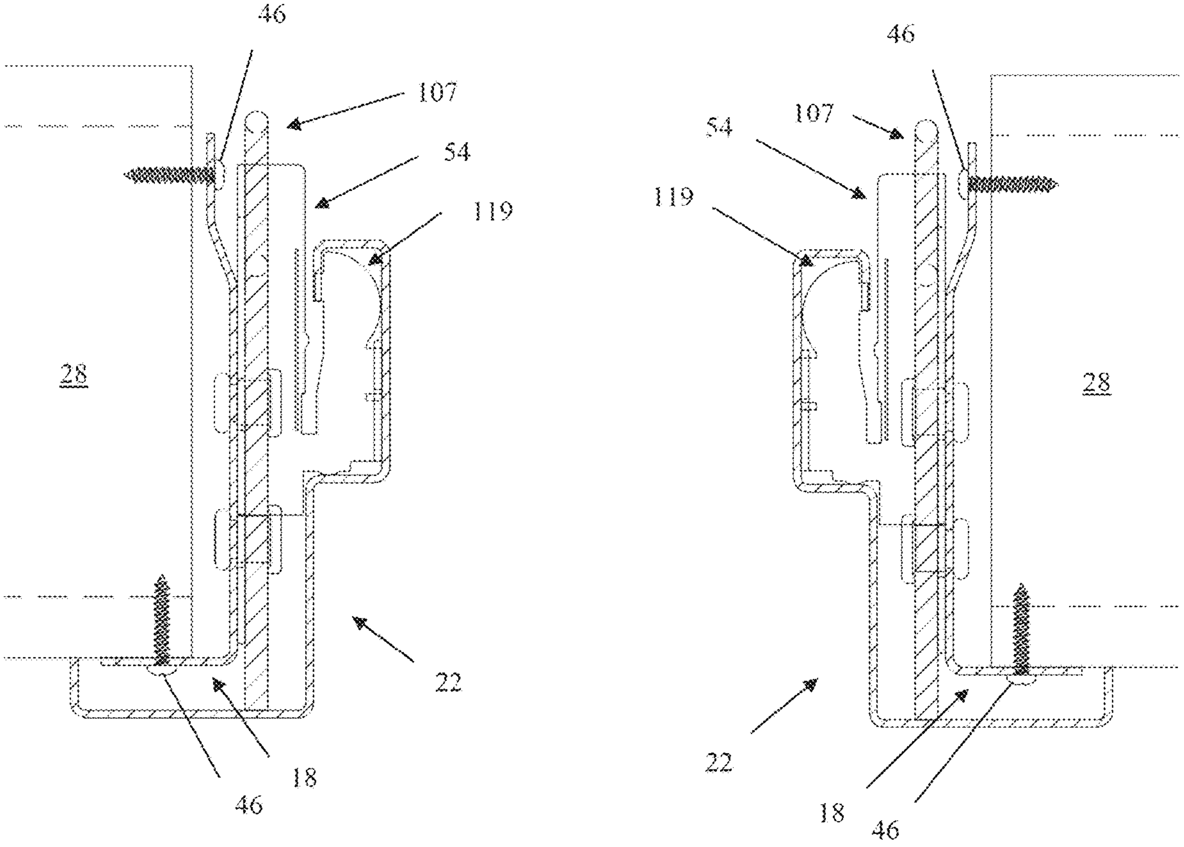
FIG. 4 is a sectional top plan view of the mounting bracket showing an additional fastener used to connect the mounting plates to the walls of the building of the improved apparatus and method for mounting a door frame in a building of the present invention.
Figure 5:
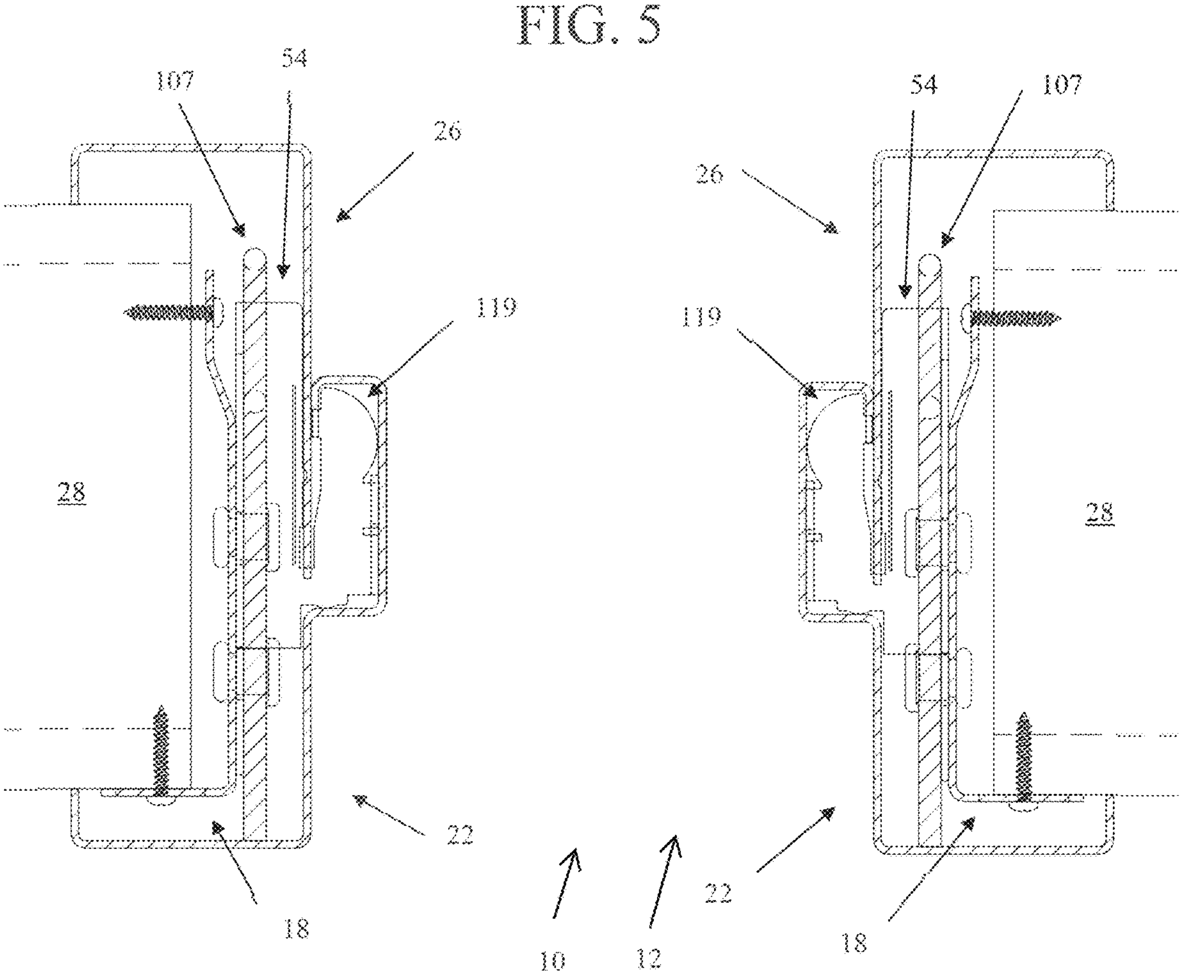
FIG. 5 is a sectional top plan view of the trim frame connected to the door support frame which is connected to the mounting bracket which is connected to the walls of the building of the improved apparatus and method for mounting a door frame in a building of the present invention.

To secure the door support frame 22 to the bracket 18, a stud lock clip 107 is utilized to secure the mounting pins 20 within each of the four bracket mounting portions 54, as seen in FIGS. 3D and 3E, thereby leading to four stud lock clips 107. The stud lock clip 107 is similar to a conventional cotter pin configuration, wherein the stud lock clip 107 is fabricated from a metallic rod having an elongated straight portion 109 that is bent substantially 180 degrees such that a curvilinear portion 111 extends back underneath the straight portion 109 creating a space between the straight portion 109 and the curvilinear portion 111 of the stud lock clip 107. The curvilinear portion 111 of the stud lock clip 107 has a first and second landing 113 that are substantially straight and parallel to the elongated straight portion 109, wherein a substantially straight third landing 115 is also substantially parallel to the elongated straight portion 109, spaced between the first and second landings 113, and closer to the elongated straight portion 109 than the first and second landings 113. The stud lock clip 107 engages the stems 52 of the two mounting pins 20 of the mounting bracket 18 by sliding the stud lock clip 107 over the stems 52 of the mounting pins 20 in the space created between the elongated straight portion 109 and the curvilinear portion 111 of the stud lock clip 107, until the stud lock clip 107 reaches a locked position wherein the first and second landings 113 of the stud lock clip 107 engage the stems 52 of the two mounting pins 20, as seen in FIG. 3E. The stems 52 of the mounting pins 20 are slightly larger in diameter than the distance between the elongated straight portion 109 and the first and second landings 113 of the stud lock clip thereby creating a spring bias force against the stems 52 of the mounting pins 20 caused by the curvilinear portion 111 of the stud lock clip 107 flexing with respect to the straight portion 109 of the stud lock clip 107. The bottom 89 and the heads 50 of the mounting pins 20 prevent the stud lock clip 107 from moving fore and aft of the bottom 89 and the mounting pins 20. The third landing 115 of the stud lock clip 107 is located between the stems 52 of the two mounting pins 20 and restricts the stud lock clip 107 from moving along the longitudinal axis 100 of the bottom 89 of the bracket engaging portion 54. The stud lock clip 107 prevents the mounting pins 20 from moving relative to the bracket mounting portion 54 thereby securing the door support frame 22 to the bracket 18. Once the stud lock clip 107 is in the locked position and the door support frame is properly connected to the mounting bracket 18, a fastener may be inserted in the mounting holes 60 of the mounting bracket 18 and threaded into the walls 28 to secure the mounting bracket 18 and the door support frame 22 to the walls 28.

The bracket mounting portion 54 of the door support frame 22 remains outside the soffit 56, and the soffit engaging portion 119 is located inside the soffit 56, wherein the bracket mounting portion 54 and the soffit engaging portion are integrally formed, as seen in FIGS. 3, 6A, 6B, and 7E. As previously described, the bracketing mounting portion 54 includes the bottom 89 and the two similar side walls 91 that extend away from sides of the bottom 89 at substantially right angles. The two side walls 91 are each substantially rectangular and extend away from the bottom 89 of the bracket mounting portion 54 toward the interior of the door support frame 22 and outside the soffit 56. The soffit engaging portion 119 is integral with and extends from each of the side walls 91 of the bracket engaging portion 54 via a connecting portion 121, whereby the sides walls 91 of the bracket engaging portion 54 and the soffit engaging portion 119 oppose each other to form an open-ended slot 123 between each of the side walls 91 of the bracket connecting portion 91 and the soffit engaging portion 119 and along the opening of the soffit 56 of the door support frame 22. The soffit engaging portion 119 has a first portion 125 that is substantially planar and substantially parallel with the side walls 91 of the bracket engaging portion 54 and a second portion or flange 127 that is integral with and substantially perpendicular to the first portion 125 of the soffit engaging portion 119. Both the first and second portions 125, 127 of the soffit engaging portion 119 are housed within and connected to inside surfaces of the soffit 56 of the door support frame 22.

Figure 6A:
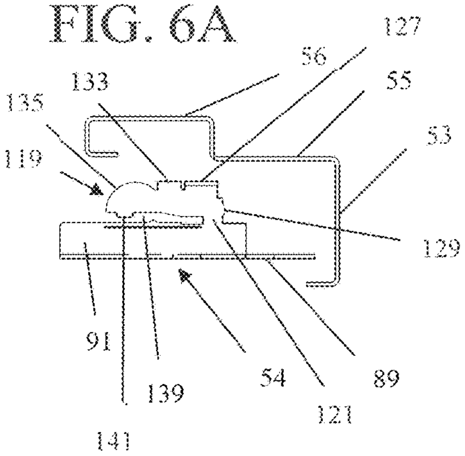
FIG. 6A-6B is a schematic diagram showing the soffit engaging portion engaging the soffit of the door support frame of the improved apparatus and method for mounting a door frame in a building of the present invention.
Figure 6B:
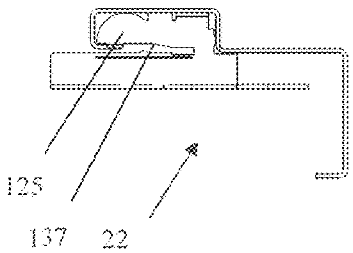
Figure 6C:
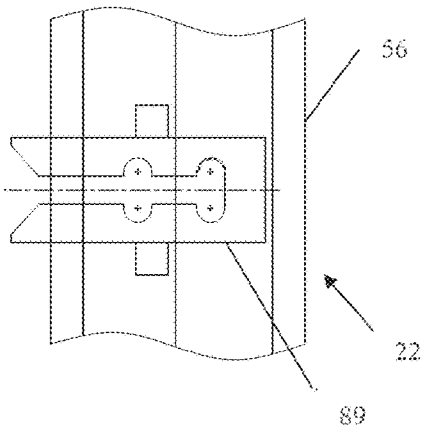
FIG. 6C is a side plan view showing the bracketing engaging portion of the door support frame for engaging the mounting bracket of the improved apparatus and method for mounting a door frame in a building of the present invention.
Figure 6D:
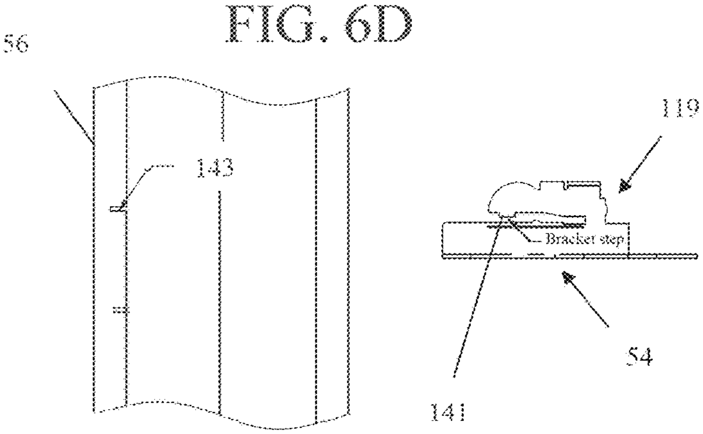
FIG. 6D is a schematic diagram showing the tabs of the soffit engaging portion engaging notches in the soffit of the door support frame of the improved apparatus and method for mounting a door frame in the building of the present invention.
Figure 16A:
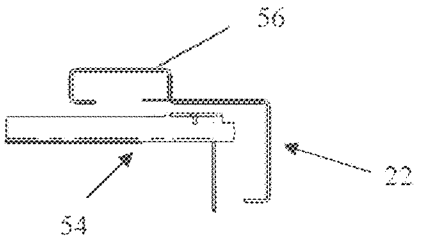
FIGS. 16A-16E are schematics diagrams showing the door support frames of the improved apparatus and method for mounting a door frame in a hospital building of the present invention.
Figure 16B:
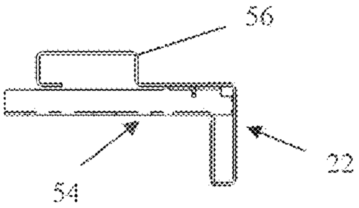
Figure 16C:
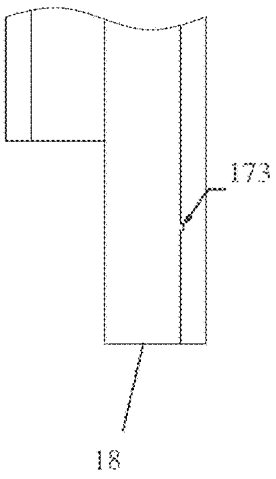
Figure 16D:
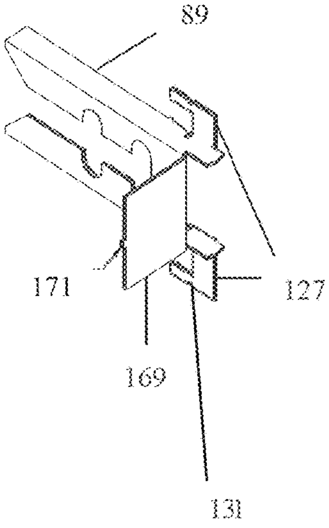
Figure 16E:
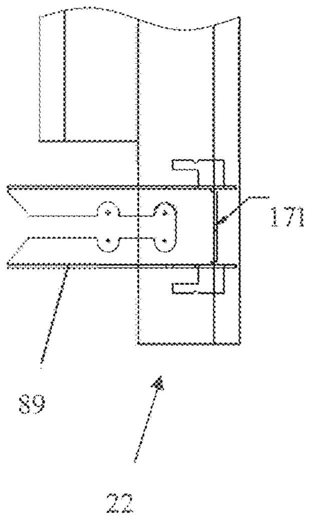

The soffit engaging portion 119 is designed to fit within the soffit 56 of the door support frame 22 with specific contact points for securing and locating the sofit engaging portion 119 to the sofit 56 while also creating points for spot welding. The sofit engaging portion 119 extends downward from the connecting portion 121 to form an integral nub 129 on an end of the first portion 125 of the soffit engaging portion 119. The nub 129 engages an inner side wall of the soffit 56 to assist in locating the soffit engaging portion 119 in the soffit 56 of the door support frame 22. The second portion or flange 127 of the soffit engaging portion 119 contacts and extends along a top inner surface of the soffit 56 thereby providing another contact point for properly locating the sofit engaging portion 119 in the soffit 56 of the door support frame 22. The flange 127 has a semi-circular recess 131, as best shown in the modified bracketing engaging portion 54 in FIG. 16D, for spot welding the flange 127 to the soffit 56. It should be noted that other spot-welding locations may be utilized. As the soffit engaging portion 119 extends away from the connecting portion 121, a substantially straight landing 133 is provided on a bottom surface of the soffit engaging portion 119 adjacent the flange 127. The landing 133 engages the top inner surface of the soffit 56 for properly locating the soffit engaging portion 119 to the soffit 56. Adjacent the landing 133 opposite from the flange 127, the soffit engaging portion 119 has an arcuate structure 135 forming a free end of the soffit engaging portion 119. The arcuate structure 135 is designed to assist in moving the soffit engaging portion 119 into the soffit 56. A top surface 137 of the soffit engaging portion 119 extends substantially parallel with the side walls 91 of the bracket engaging portion 54 thereby forming a slot 139 between the top surface 137 of the soffit engaging portion 119 and the side walls 91 of the bracket engaging portion 54. A substantially rectangular tab 141 is integrally formed on the top surface 137 toward the free end of the soffit engaging portion 119, and the tab 141 is utilized to engage a notch 143 formed in a bottom wall or lip 145 of the soffit 56, as best shown in FIG. 6D. The engagement of the tab 141 in the notch 143 of the soffit 56 assists in properly locating and maintaining the soffit engaging portion 119 in the soffit 56. All the above-mentioned contact points between the soffit engaging portion 119 and the soffit 56 assist in properly locating and maintaining the sofit engaging portion 119 and the bracket engaging portion 54 of the door support frame 22 in a proper position so that spot welds can be properly placed to secure the soffit engaging portion 119 to and within the soffit 56 and the bracket engaging portion 54 in the door support frame 22.

Figure 7A:
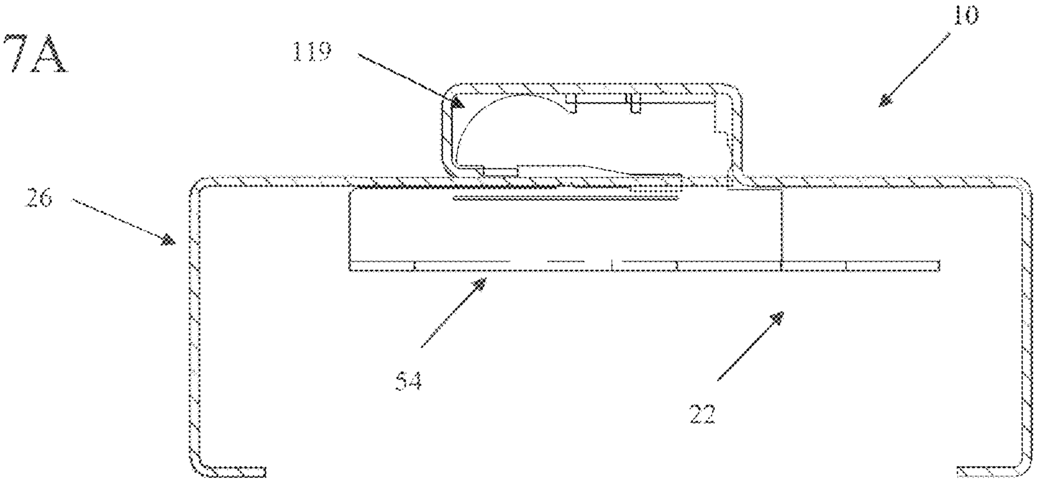
FIG. 7A-7C are sectional views of the adjustable positioning feature of the trim frame to the door support frame of the improved apparatus and method for mounting a door frame in a building of the present invention.
Figure 7B:
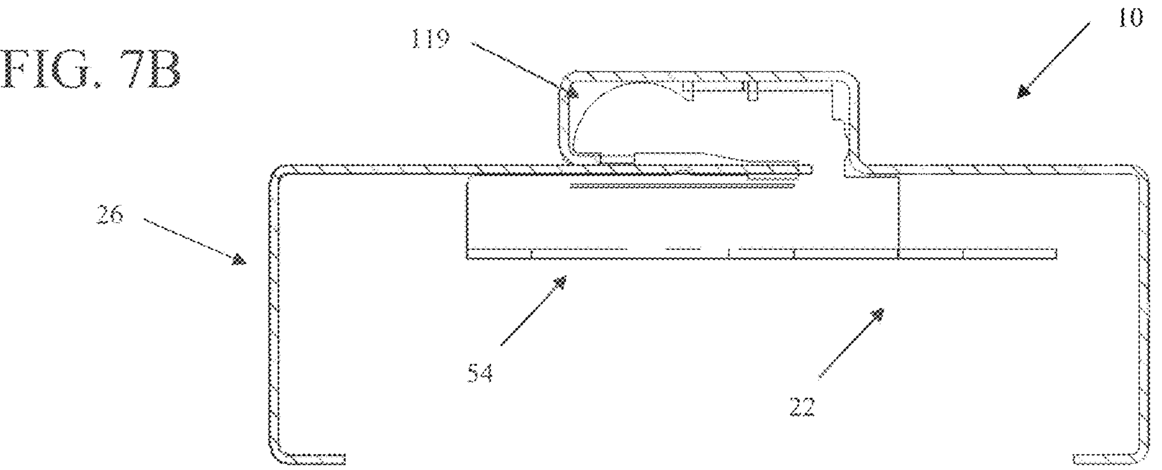
Figure 7C:
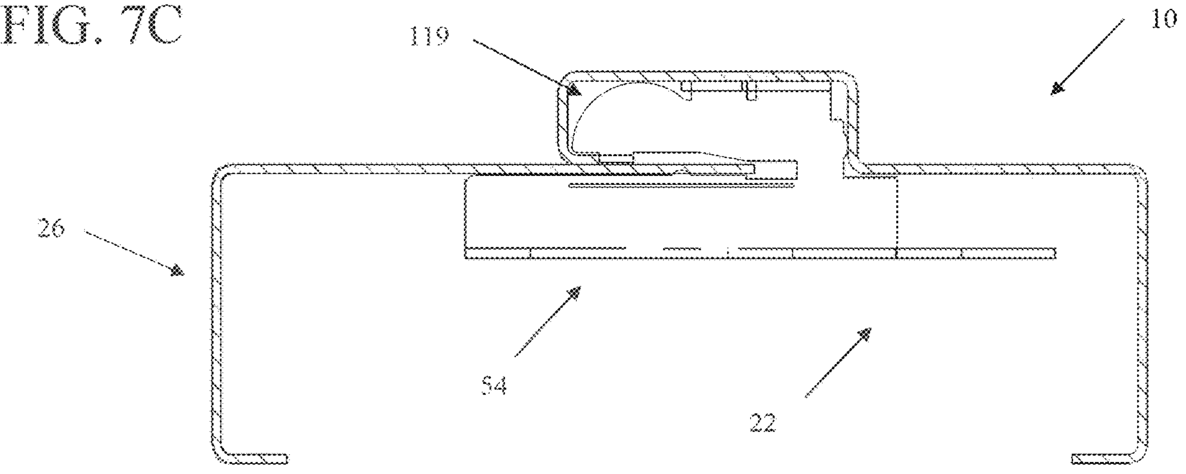
Figure 7D:
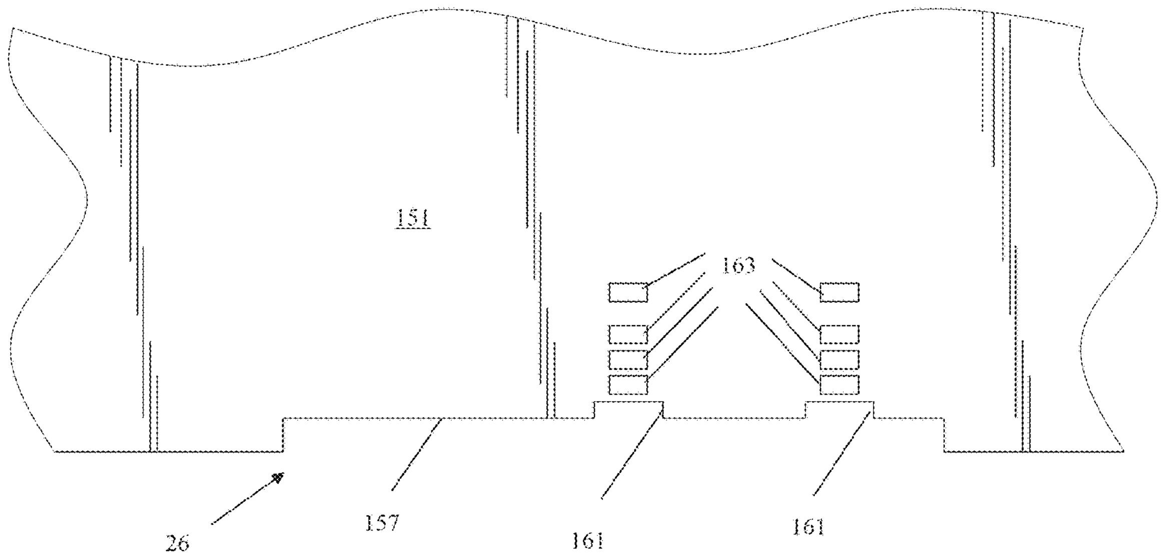
FIG. 7D is a side plan view showing the apertures and recesses of the adjustable positioning feature of the trim frame to the door support frame of the improved apparatus and method for mounting a door frame in a building of the present invention.
Figure 7E:
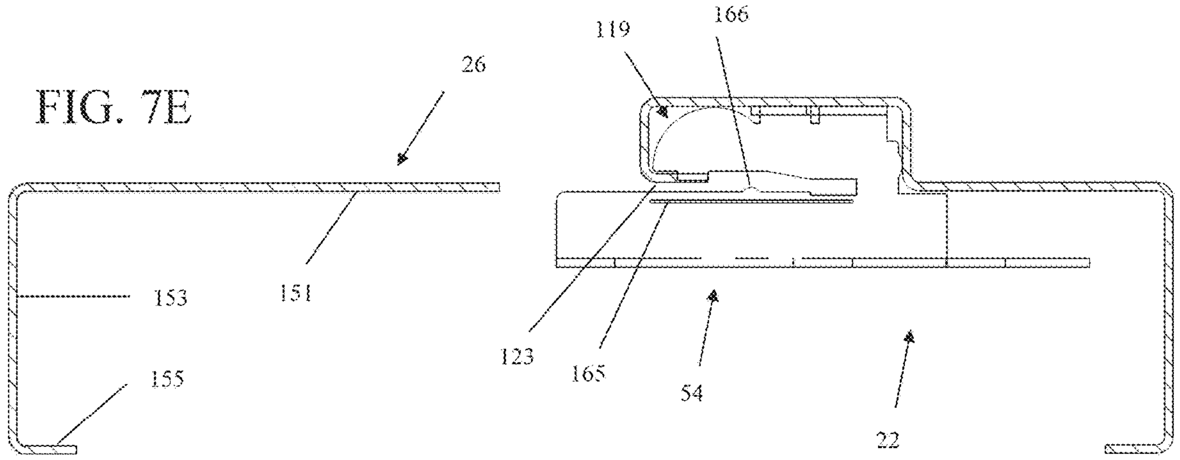
FIG. 7E is a sectional view of the trim frame and the door support frame prior to the trim frame engaging the door support frame of the improved apparatus and method for mounting a door frame in a building of the present invention.
Figure 8:
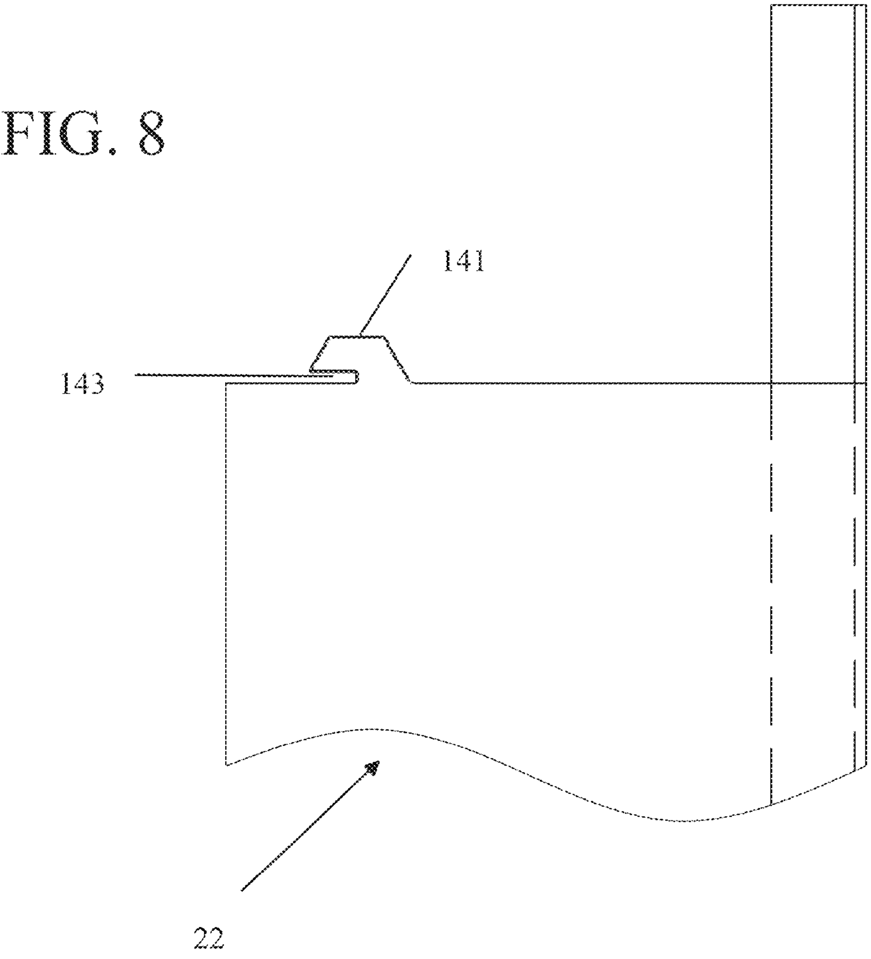
FIG. 8 is a side plan view showing the tabs utilized to engage the vertical sides and header of the door support frame and the trim frame of the improved apparatus and method for mounting a door frame in a building of the present invention.
Figure 13:
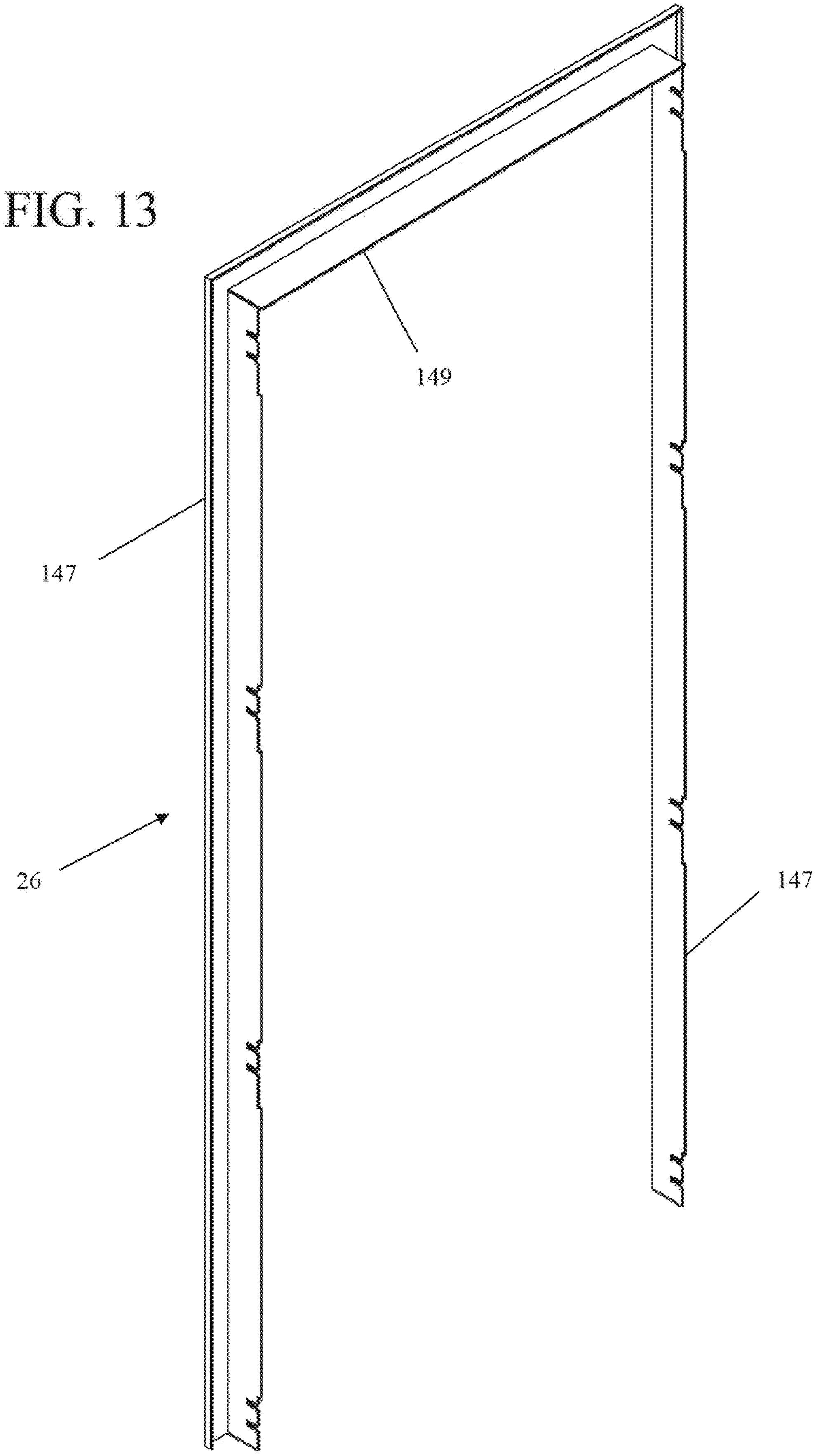
FIG. 13 is a perspective view of the trim frame of the of the improved apparatus and method for mounting a door frame in a building of the present invention.

To engage the trim frame 26 to the door support frame 22, the trim frame 26 has a substantially U-shaped configuration having a pair of opposing sides 147 and a top 149 connected to the opposing sides 147, as seen in FIG. 13. The U-shaped configuration of the trim frame 26 corresponds to the side surfaces 36, the rear surface 38, and the top surface of the door opening 14. As seen in FIG. 7E, each side 147 of the trim frame 26 has a substantially J-shaped, integral configuration having a long side 151 that extends along the side surface 36 of the wall 28, an end 153 that extends along the rear surface 38 of the wall 28, and a short side 155 that extends substantially perpendicular to the rear surface 38 of the wall 28 to space the trim frame 26 from the rear surface 38 of the wall 28. As seen in FIGS. 7D, 12, and 13, the long side 151 of the trim frame 26 has four similar open-ended recesses 157 that correspond to the four bracket engaging portions 54 in each of the four segments 45 in the door support frame 22. Each recess 157 is substantially rectangular with two smaller substantially rectangular recesses 161 in communication with the recess 157 and extending further into the long side 151 of the trim frame 26. Four substantially successive rectangular apertures 163 in the long side 151 of the trim frame 26 are aligned behind each of the two smaller recesses 161 for a total of eight apertures 163 corresponding to each recess 157. The two smaller recesses 161 and the eight apertures 163 are aligned in width with the slot 139 formed between the sofit engaging portion 119 and the side walls 91 of each of the bracket engaging portions 54 of the door support frame 22. It should be noted that the disclosure is not limited to eight apertures 163 in each recess 157 of the trim frame 26, but rather, any number of apertures 163 may be utilized.

To secure the trim frame 26 to the door support frame 22, the trim frame 26 is moved toward the door support frame 22 from the rear surface 38 of the wall 28 toward the door opening 14 after the door support frame 22 is connected to the mounting bracket 18, as seen in FIGS. 5 and 7A-7C. As previously described, each side 147 of the trim frame 26 has four sets of the recesses 157, 161 and apertures 163 corresponding to the four segments 45 of the mounting bracket 18 and the door support frame 22. The smaller recesses 161 in the trim frame 26 are aligned with the slots 139 in the door support frame 22 such that the apertures 163 in the trim frame 26 move into the slot 139, as the trim frame 26 is moved toward the door support frame 22. A knob or bump 166 is integrally formed on a bottom edge of each of the side walls 91 of the bracket engaging portions 54 that extend into the slot 139 between the side walls 91 of the bracket engaging portion 54 and the sofit engaging portion 119 of the door support frame 22. As the trim frame 26 moves into the slot 139, the knob 166 engages one of the apertures 163 in the long side 151 of the trim frame 26, corresponding to the positions shown in FIGS. 7A, 7B, and 7C, wherein the first aperture 163 is engaged in FIG. 7C, the second aperture 163 is engaged in FIG. 7B, and the third aperture 163 is engaged in FIG. 7A. The knob 166 engaging any of the apertures 163 in the trim frame 26 allows the trim frame 26 to lock into the bracket engaging portion 54 of the door support frame 22 at varying widths, thereby providing an adjustment mechanism to adjust for varying widths of the walls 28. A narrow slot 165 may be provided in the side walls 91 of the bracket engaging portion 54 just above the bottom surface of the side walls 91 to create a certain amount of flex to the knob 166. The top surface 137 of the sofit engaging portion 119 defining the slot 139 may have an incline 167 upwards toward the sides 91 of the bracket engaging portion 54 after the knob 166 to narrow the slot 139 and ensure that the knob 166 fully engages the apertures 163. The trim frame 26 extends far enough into the slot 139 to partially or fully cover the opening in the sofit 56. The engagement of the knobs 166 in the apertures 163 of the trim frame 26 are tenacious enough to secure the trim frame 26 to the door support frame 22 but flexible enough to allow the trim frame 26 to be removed from the door support frame 22 should an installer wish to disassemble the trim frame 26 from the door support frame 22 after assembly. This is an advantage over previous designs which do not provide for the disassembly of the door frame 12 once assembled.

In operation, the pair of mounting brackets 18 are mounted in the door opening 14 of the building by having the fasteners 46 extend through the slotted apertures 44 of the mounting brackets 18 to loosely connect the mounting brackets 18 to the front surface 34 of the vertical walls 28 defining the door opening 14 of the building. When doing so, one of the mounting brackets 18 is mounted directly adjacent to or sitting on the higher side of the floor 40 defining the door opening 14. Once the one mounting bracket 18 is mounted adjacent to the highest side of the floor 40, the other mounting bracket 18 may be mounted at the same height directly across from and substantially parallel to the opposing mounting bracket 18. This may result in the other mounting bracket 18 being mounted directly on the floor 40 if the floor 40 is level, or the other mounting bracket 18 may be mounted further off the floor 40 in alignment with the first mounting bracket 18. Once the height of the mounting brackets 18 is determined, then the distance between the mounting brackets 18, or the width 30 of the door opening 14, may be adjusted by sliding the mounting brackets 18 along the fasteners 46 positioned in the slotted apertures 44 of the mounting brackets 18. The fasteners 46 in the slotted apertures 44 of the mounting bracket 18 are then threaded through and into the front surface 34 of the vertical walls 28 of the building. The door support frame 22 is moved into position for assembling the door support frame 22 to the mounting brackets 18 by moving the door support frame 22 toward the front surface 34 of the walls 28 defining the door opening 14 and engaging the stems 52 of the four sets of mounting pins 20 on the mounting bracket 18 with the angled entry way 97 of the slots 93 in the four sets of bracket engaging portions 54 of the door support frame 22 to guide the door support frame 22 into proper position within the door opening 14. As the door support frame 22 is moved further into the door opening 14, the stems 52 of the mounting pins 20 on the mounting brackets 18 are received in the open-ended slots 93 of the bracket engaging portions 54 of the door support frame 22 and slide into engagement with the first and second recesses 103, 105 of the slots 93 thereby allowing the door support frame 22 to hang from the mounting pins 20. The stud lock clips 107 are inserted over the stems 52 of the mounting pins 20 until the landings 113 of the stud lock clips 107 engage the stems 52 of the mounting pins 20 thereby locking the door support frame 22 to the mounting brackets 18. Fasteners 46 are then inserted through the mounting holes 60 in the end of the mounting brackets 18 and into the sides surface 36 of the walls 18 to secure the mounting brackets 18 to the walls 28. The trim frame 26 is then brought in from the rear surface 38 of the walls 28 defining the door opening 14 such that the long side 151 of the L-shaped configuration of the trim frame 26 is inserted through the slots 139 between the sides 91 of the bracket connecting portions 54 and the soffit engaging portions 119. The four recesses 161 and the apertures 163 in the trim frame 26 are aligned with the slots 93 in the door support frame 22, and the trim frame 26 is moved further into the slots 93 until the knob 166 on each of the sides 91 of the bracket connecting portion 54 engage the apertures 162 in the trim frame 26. The trim frame 26 is further inserted into the door opening 14 and into the slot 93, as the knob 166 ratchets along the successive apertures 163 until the trim frame 26 reaches the proper position, wherein the trim frame 26 engages the rear surface 38 of the door opening 14 and is connected to the door support frame 22. The assembly of the method and apparatus 10 of the present invention is then complete.

The improved method and apparatus 10 for mounting a door frame 12 to a door opening 14 of a building may be applied to various types of building constructions and applications. For instance, hospital end frames, concrete masonry units (CMU) or cinder block construction, and mullions for frames with sidelights may all require different types of door frames 12; however, the improved method and apparatus 10 for mounting a door frame 12 to a building can be modified to adopt to these different constructions.

Figure 15A:
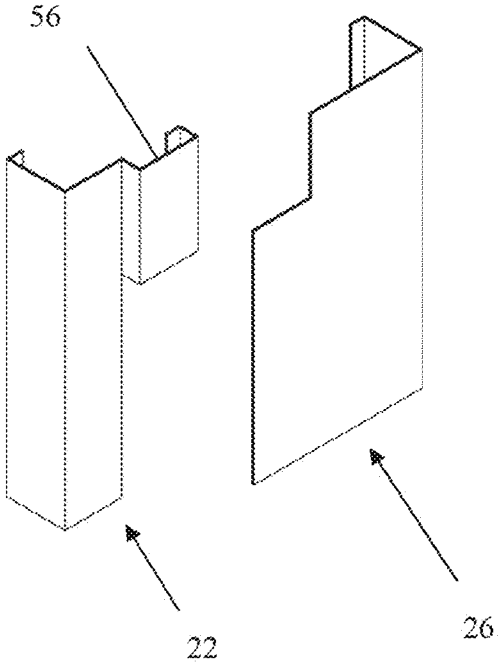
FIGS. 15A-15B are perspective views of the door support frame and the trim frame of the improved apparatus and method for mounting a door frame in a hospital building of the present invention.
Figure 15B:
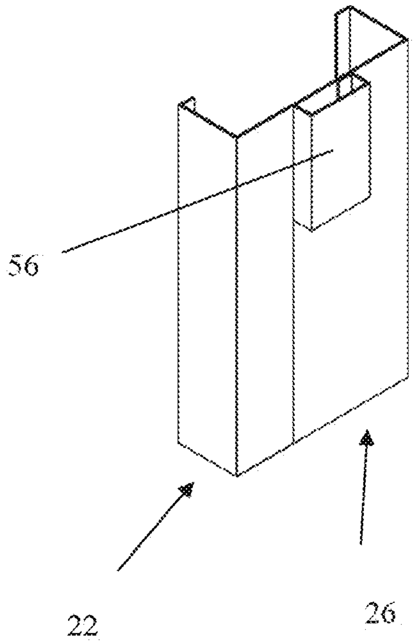
Figure 17:
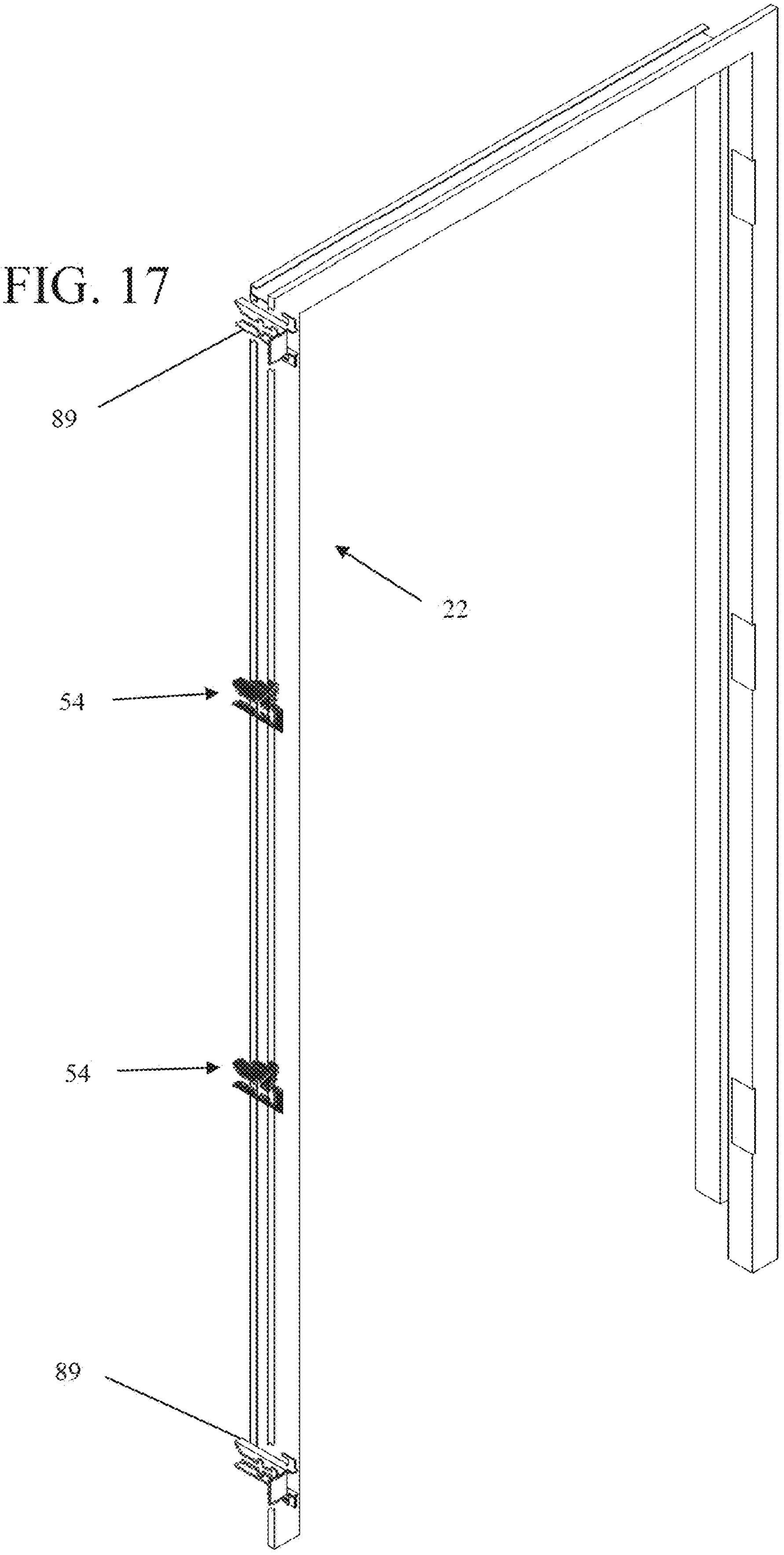
FIG. 17 is a perspective view showing the door support frame of the improved apparatus and method for mounting a door frame in a hospital building of the present invention.

For instance, hospital buildings (not shown) may require that the soffit or jamb 56 not extend all the way to the floor 40 and the top surface of the door frame 12, as the soffit or jamb 56 may typically end some height above the floor 40. In a non-limiting example, the soffit or jamb 56 may end as much as four inches from the floor 40 and the top surface of the door frame 12, as seen in FIGS. 15A and 15B. This is to ensure that the floor 40 and corners of the door frame 12 of the hospital can be fully and easily cleaned. The trim frame 26 extends further toward the door support frame 22 underneath and above the sofit or jamb 56. This allows the trim frame 26 to cover that portion of the wall 18 that is no longer covered by the sofit or jamb 56. However, since the bracket connecting portion 54 is below and above the sofit or jamb 56, the bracket connecting portions 54 at the bottom and top of the door support frame 22 must be modified, while the bracketing connecting portions 54 in the middle of the door support frame remain the same as previously described, as shown in FIG. 17. As shown in FIGS. 16A, 16B, 16C, 16D, and 16E, the modified bracket connecting portions 54 at the top and bottom of the door support frame 22 are similar to the previously described bracket connecting portions 54, as the bottom 89 of the bracketing connecting portions 54 maintains the same open-ended slot 93 and semi-circular recesses 103, 105 for receiving the stems 52 of the mounting pins 20 on the mounting bracket 18. However, the soffit engaging portion 119 is removed, since the trim frame 26 does not engage the sofit engaging portion 119 at the top and bottom of the door support frame 22. Instead, the bracketing connecting portions 54 retain the flanges 127 from the soffit engaging portion 119, and a free end 169 of the bottom 89 is bent outward at a substantially right angle relative to the bottom 89 of the bracket engaging portions 54. The free end 169 of the bottom 89 of the bracketing engaging portion 54 has a substantially rectangular tab 171 that extends integrally outward from the free end 169 of the bottom 89 to engage a corresponding notch 173 formed in the door support frame 22. The engagement of the tab 171 by the notch 173 allows for the proper vertical positioning of the door support frame 22 related to the mounting bracket 18. Thus, the four bracket engaging portions 54 of the door support frame 22 still engage the mounting brackets 18 as previously described; however, the trim frame 26 only engages the middle two bracketing engaging portions 54 and soffit engaging portions 119 of the door support frame 22.

Figure 18:
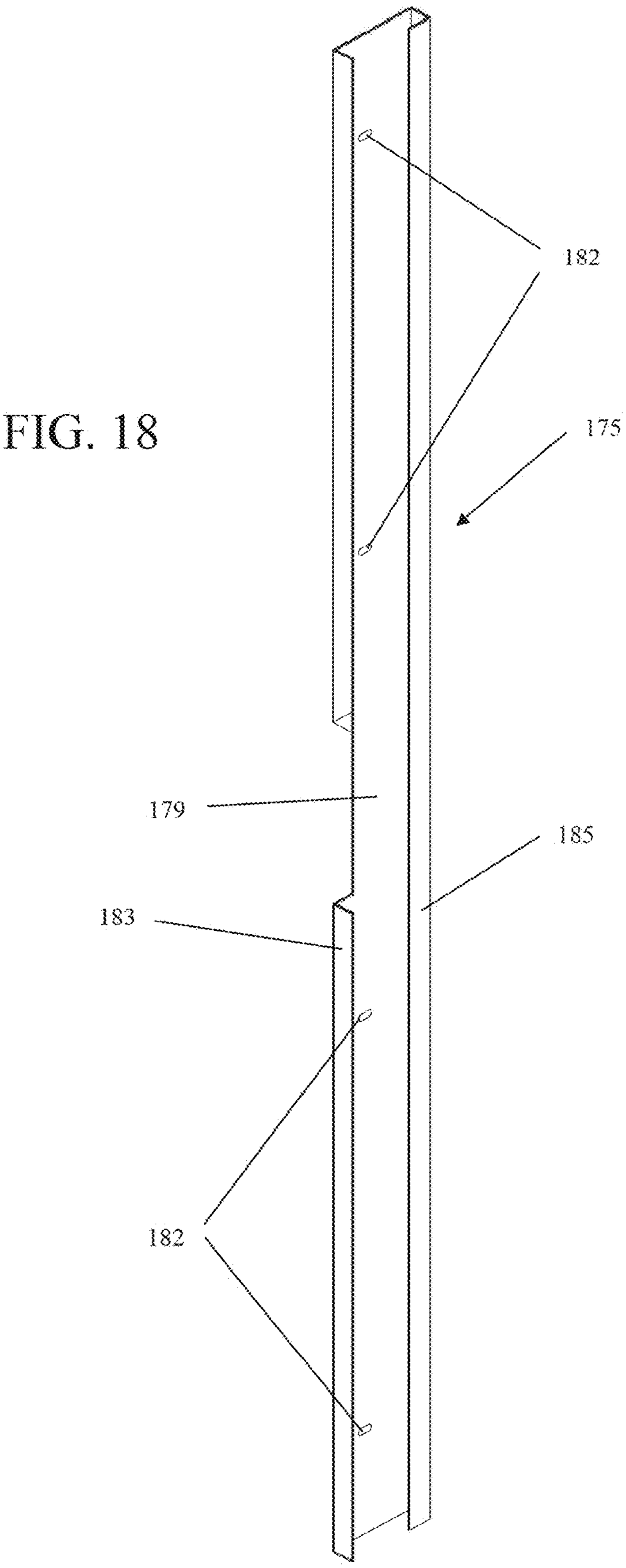
FIG. 18 is a perspective view of a mounting adapter of the improved apparatus and method for mounting a door frame in a CMU building of the present invention.
Figure 19:
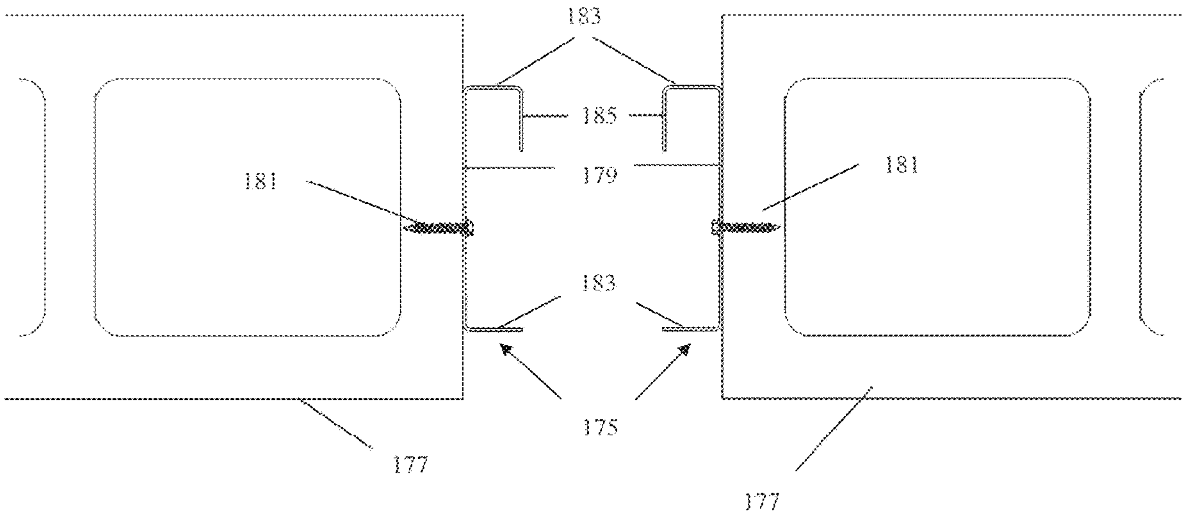
FIG. 19 is a schematic diagram showing the mounting adapter of the improved apparatus and method for mounting a door frame in a building of the present invention connected to cylinder blocks of a CMU building.
Figure 20:
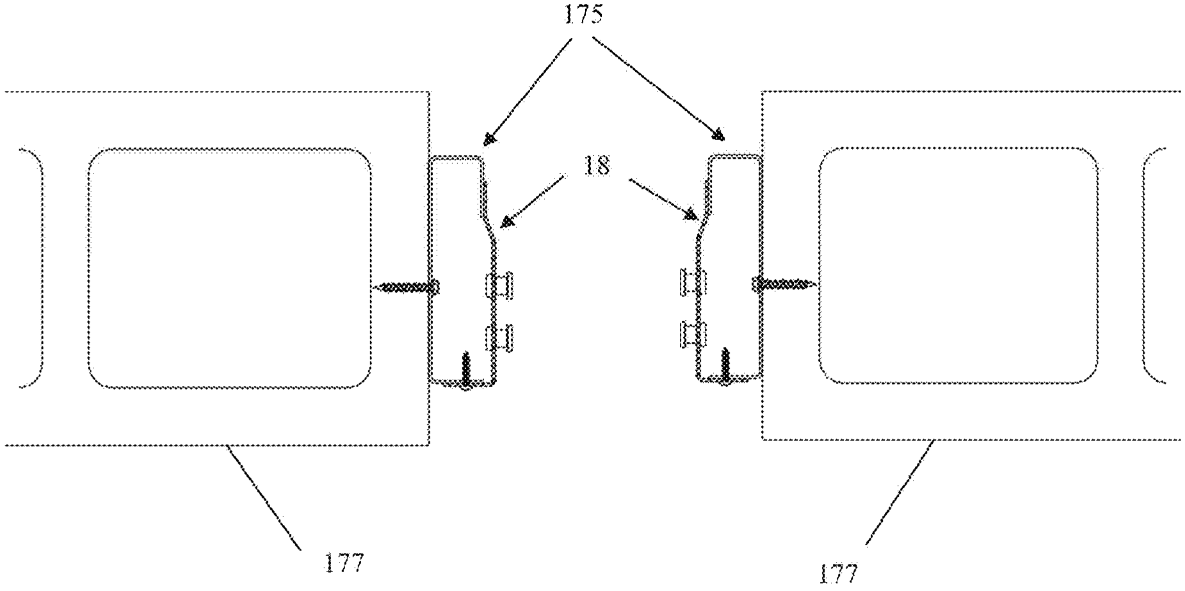
FIG. 20 is a schematic diagram showing the mounting adapter connected to the mounting bracket of the improved apparatus and method for mounting a door frame in a CMU building of the present invention.
Figure 21:
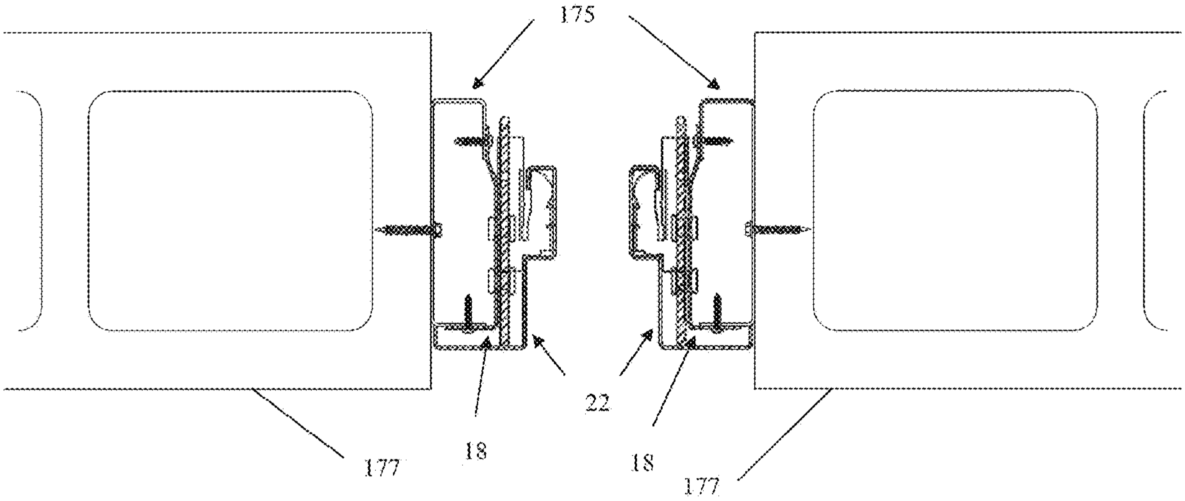
FIG. 21 is schematic diagram showing the mounting adapter connected to the mounting bracket which is connected to the door support frame of the improved apparatus and method for mounting a door frame in a CMU building of the present invention.
Figure 22:
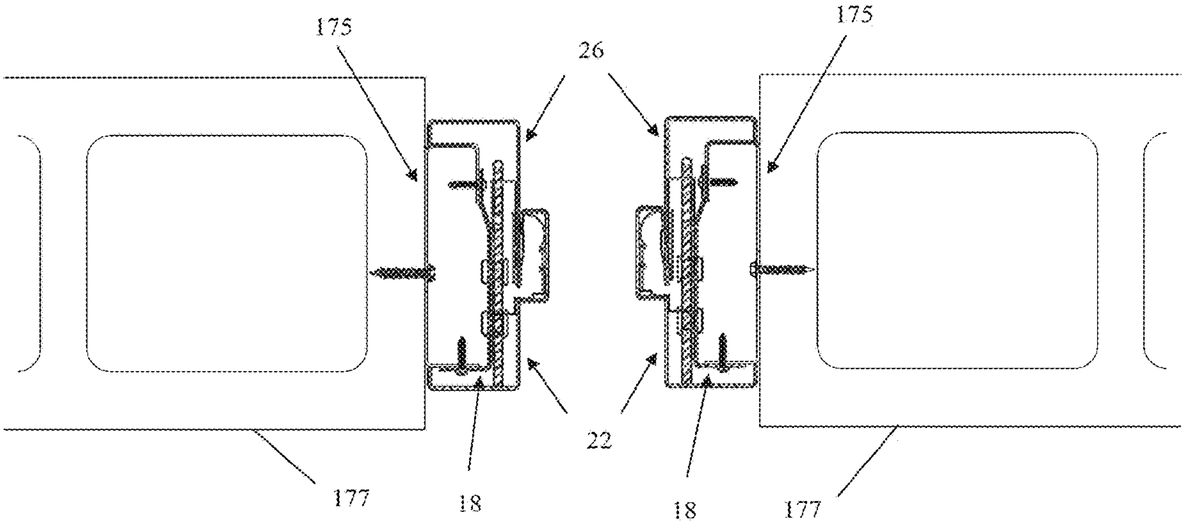
FIG. 22 is schematic diagram showing the mounting adapter connected to the mounting bracket which is connected to the door support frame which is connected to the trim frame of the improved apparatus and method for mounting a door frame in a CMU building of the present invention.

As for buildings constructed with CMU's, a mounting adapter 175 is utilized to attach the mounting bracket 18 to cylinder blocks 177. As shown in FIGS. 18 and 19, the mounting adapter 175 provides a substantially C-shaped structure wherein a back wall 179 overlies and is connected to the side surfaces 36 of the walls 28 through the use of conventional fasteners 181 extending through four apertures 182 provided in the back wall 179 of the mounting adapter 175 and into the cylinder blocks 177. A pair of side walls 183 of the mounting adapter 175 extend integrally inward from the back wall 179 of the mounting adapter 175 into the door opening 14. One of the side walls 183 has a front wall 185 that extends integrally downward and substantially parallel to the back wall 179 of the mounting adapter 175. As seen in FIG. 20, the mounting bracket 18 maintains the same configuration as previously described except the mounting bracket 18 is connected to the mounting adapter 175 by way of conventional fasteners 181 as opposed to being connected directly to the walls 28. The door support frame 22 and the trim frame 26 are then connected to the mounting bracket 18, as previously described and shown in FIGS. 21 and 22.

Figure 23D:
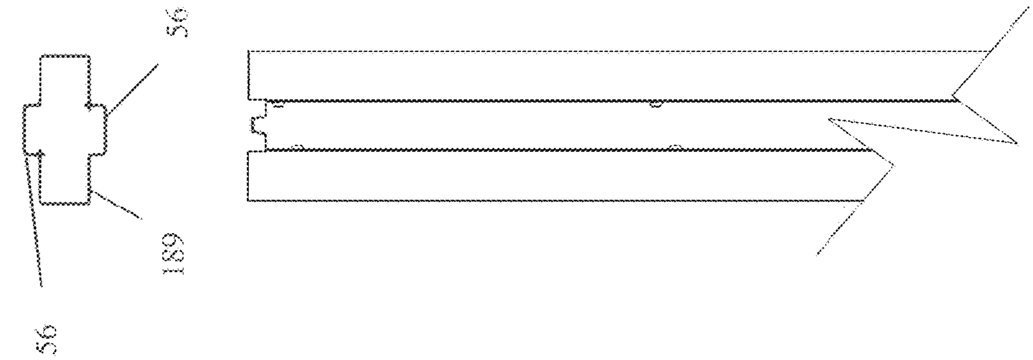
FIGS. 23A-23D are schematic diagrams showing mullions of the improved apparatus and method for mounting a door frame in a building of the present invention for use on sidelights.
Figure 23C:
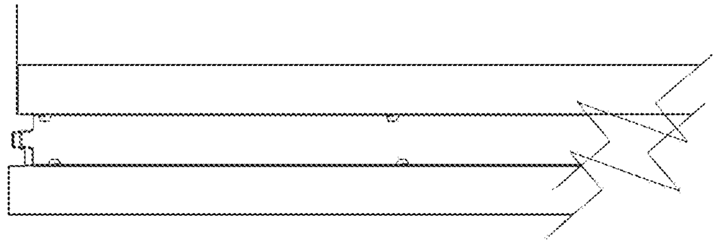
Figure 23B:
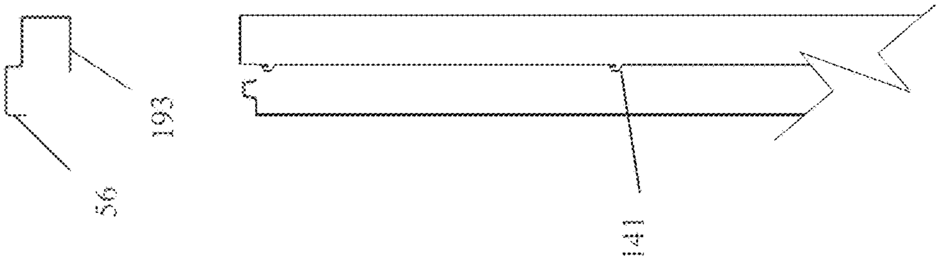
Figure 23A:
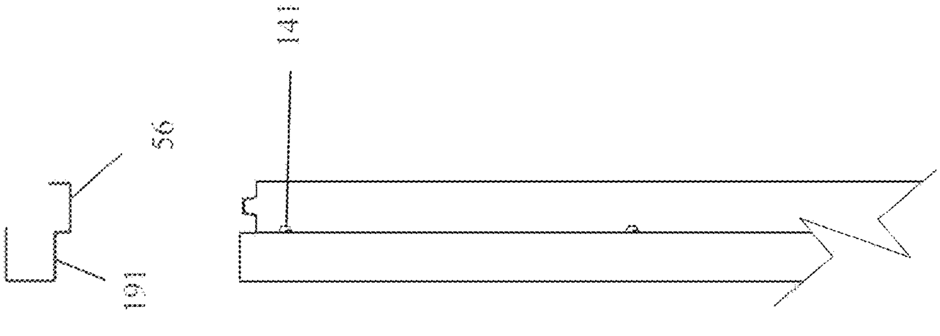
Figures 24A, 24B, 24C, 24D:
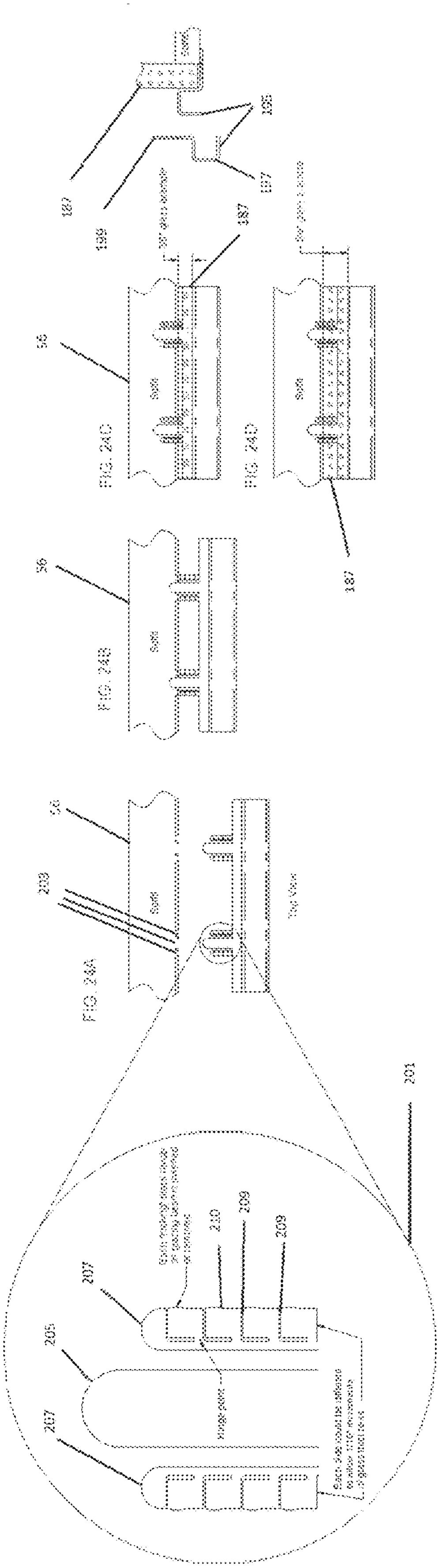
FIG. 24A-24D schematic diagrams showing a glazing bead for use in mounting sidelights for the improved apparatus and method for mounting a door frame in a building of the present invention.

For door frames 12 having sidelights 187, which are windows mounted adjacent the door opening 14, mullions 189 are created with soffits 56 formed on both sides of the door frame 12 to secure the sidelights 187 between the door frame 12 and the walls 28. Similar first and second door support frames 191, 193 are utilized without the bracket engaging portions 54 and the soffit engaging portions 119, wherein the first door support frame 191 is aligned opposite the second door support frame 193 in a mirror configuration such that the first and second door frames 191, 193 create an enclosed mullion 189, as shown in FIGS. 23A-23D. Tabs 141, as previously described, are formed in the first and second door frames 191, 193 to engage and connect the first and second door frames 191, 193 together to form the mullion 189, as shown in FIG. 23D. The sidelights 187 are installed by placing a glass pane 187 in the opening created by the mullion 189 and inserting a glazing bead 195 around the circumference of the glass pane 187, such that the glass pane 187 is encased between the mullion 189 and the glazing bead 195, as seen in FIGS. 24A-24D. The glazing bead 195 is constructed of an inverted U-shaped channel 197 having a substantially planar connecting portion 199 extending from an end of the U-shaped channel 197, such that a side of the U-shaped channel 197 abuts the outer portion of the glass pane 187 while the connecting portion 199 extends under the glass and into the soffit 56 of the mullion 189. The inverted U-shaped channel 197 holds the glass pane 187 against the mullion 189, and the connecting portion 199 provides a snap feature 201 that utilizes engagement features to engage numerous openings 203 in the mullion 189 to secure the U-shaped channel 197 against the glass pane 187. Each engagement feature of the snap feature 201 provides a middle post 205 having a rounded end and a pair of locking blocks 207 located adjacent both sides of the middle post 205 that extend integrally from the connecting portion 199 of the glazing bead 195. The locking blocks 207 are fabricated from successive L-shaped open-ended slots 209 that extend through a body 210 of the locking blocks 207. To connect the glazing bead 195 to the soffit 56, the connecting portion 199 is moved into engagement with the soffit 56 such that each engagement feature comprises the middle post 205 and the body 210 of the locking blocks 207 to engage a set of three openings 203 in the soffit 56. As the connecting portion 199 moves further into the soffit 56, the walls of the soffit 56 defining the openings 203 engage the open-ended slots 209 formed in the body of the locking blocks 207. The locking blocks 207 formed between the slots 209 maintain the position of the connecting portion 199 while allowing the locking blocks 207 to pivot and release the wall of the soffit 56 should the connecting portion 199 be moved further into the soffit 56 to adjust for a thinner piece of glass pane for the sidelight 187. The pivoting of the locking blocks 207 is allowed due to the small amount of material that is formed between the closed end and the midportion of adjacent slots 209. Again, the ratcheting effect of the snap feature 201 allows the snap feature 201 to compensate for various thicknesses of the glass pane 187 while providing a finished look to the glazing bead 195 without the need for screws or holes in the glazing bead 195. Thus, the snap feature 201 is an improvement over current designs in that the snap feature 201 has no exposed fasteners and reduces the labor time associated with installing the glazing bead 195.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An improved apparatus for mounting a door frame to a door opening defined by walls of a building, wherein the door opening is defined by a pair of side surfaces of the walls, and a floor substantially parallel to a top surface of the walls, wherein the floor and the top surface extend between side surfaces of the walls, comprising:

at least one mounting bracket, wherein the at least one mounting bracket is connectable to at least one side surface of the walls;

a plurality of mounting pins connected to the at least one mounting bracket;

a first door support frame having a soffit integral with the first door support frame;

a plurality of soffit engaging portions connected to and enclosed within the soffit;

a plurality of bracket engaging portions integral with the plurality of soffit engaging portions for engaging the plurality of mounting pins on the at least one mounting bracket and connecting the first door support frame to the at least one mounting bracket; and a trim frame connected to the plurality of bracket engaging portions and the plurality of soffit engaging portions for securing the trim frame to the first door support frame.

2. The improved apparatus in claim 1, further comprising:

a lock clip for releasably engaging the plurality of mounting pins of the at least one mounting bracket and securing the at least one mounting bracket to the first door support frame.

3. The improved apparatus in claim 1, further comprising:

the first door support frame having a first slot formed between the plurality of soffit engaging portions and the plurality of bracket engaging portions for receiving the trim frame;

the plurality of bracketing engaging portion having a plurality of knobs extending into the first slot; and the trim frame having a plurality of apertures wherein the trim frame is received by the first slot in the first door support frame and the plurality of knobs on the plurality of bracket engaging portions engage the plurality of apertures in the trim frame to releasably and adjustably secure the trim frame to the first door support frame.

4. The improved apparatus in claim 3, further comprising:

the plurality of bracket engaging portions having a second slot extending therethrough adjacent the plurality of knobs, and the second slot formed between the plurality of bracket engaging portions and the plurality of soffit engaging portions to allow the plurality of knobs to flex and be removed from the plurality of apertures formed in the trim frame.

5. The improved apparatus in claim 1, further comprising:

the soffit of the first door support frame housing the plurality of soffit engaging portions;

the plurality of soffit engaging portions having tabs that engage notches formed in the soffit for locating the plurality of soffit engaging portions in the soffit; and a landing, a flange, and a nub formed on the plurality of soffit engaging portions and engaging the soffit for further locating the plurality of soffit engaging portions in the soffit.

6. The improved apparatus in claim 1, further comprising:

a jig having a plurality of apertures that receive grommets for releasably engaging the plurality of mounting pins of the plurality of mounting brackets to support and protect the plurality of mounting brackets prior to and during assembly of the plurality of mounting brackets to the side surfaces of the walls.

7. The improved apparatus in claim 1, further comprising:

a metal strip releasably attached to the plurality of mounting brackets to assist in transportation and assembly of the plurality of mounting brackets to the side surfaces of the walls.

8. The improved apparatus in claim 1, further comprising:

the first door support frame having opposing sides and a header extending between the opposing sides;

the opposing sides of the first door support frame each having ends with tabs that receive ends of the header; and the ends of the opposing sides of the first door support frame each having recesses and projections that engage corresponding recesses and projections formed in the ends of the header to form the first door support frame.

9. The improved apparatus in claim 8, further comprising:

at least one mounting adapter connected to at least one inside surface of the walls and the at least one mounting bracket wherein the at least one inside surface of the walls are fabricated from CMU.

10. The improved apparatus in claim 1, further comprising:

a portion of the first door support frame not having a soffit wherein at least one bracket engaging portion not having a soffit engaging portion is connected to the first door support frame to not allow for a soffit to be formed on the first door support frame adjacent the floor and the top surface of the door opening.

11. The improved apparatus in claim 1, further comprising:

the first door frame connected to a second door frame wherein the first door frame is aligned opposite the second door frame in a mirror configuration such that a mullion is formed adaptable to receive a sidelight.

12. The improved apparatus in claim 11, further comprising:

a glazing bead having an inverted U-shaped channel and a planar connecting portion wherein the inverted U-shaped channel is adaptable to abut a side of the sidelight against the mullion and the planar connecting portion is adaptable to extend under the sidelight; and the planar connecting portion having a snap feature that engages at least one opening in the soffit of the first door frame or the second door frame to adaptably secure the sidelight in the mullion.

* * * * *